(12) United States Patent
Ravat

(10) Patent No.: US 12,545,339 B2
(45) Date of Patent: Feb. 10, 2026

(54) TRACK SYSTEM FOR TRACTION OF A VEHICLE

(71) Applicant: CAMSO INC., Magog (CA)

(72) Inventor: Olivier Ravat, Magog (CA)

(73) Assignee: Camso Inc., Magog (CA)

( * ) Notice: Subject to any disclaimer, the term of this patent is extended or adjusted under 35 U.S.C. 154(b) by 700 days.

(21) Appl. No.: 17/794,709

(22) PCT Filed: Jan. 22, 2021

(86) PCT No.: PCT/CA2021/050073
§ 371 (c)(1),
(2) Date: Jul. 22, 2022

(87) PCT Pub. No.: WO2021/146817
PCT Pub. Date: Jul. 29, 2021

(65) Prior Publication Data
US 2023/0037901 A1    Feb. 9, 2023

Related U.S. Application Data

(60) Provisional application No. 62/964,849, filed on Jan. 23, 2020.

(51) Int. Cl.
| | | |
|---|---|---|
| *B62D 55/084* | (2006.01) |
| *B62D 55/10* | (2006.01) |
| *B62D 55/108* | (2006.01) |
| *B62D 55/125* | (2006.01) |
| *B62D 55/14* | (2006.01) |
| *B62D 55/24* | (2006.01) |

(52) U.S. Cl.
CPC ........... *B62D 55/084* (2013.01); *B62D 55/10* (2013.01); *B62D 55/108* (2013.01); *B62D 55/125* (2013.01); *B62D 55/14* (2013.01); *B62D 55/244* (2013.01)

(58) Field of Classification Search
CPC ..... B62D 55/104; B62D 55/108; B62D 55/10
See application file for complete search history.

(56) References Cited

U.S. PATENT DOCUMENTS

| | | | | |
|---|---|---|---|---|
| 5,316,381 A | * | 5/1994 | Isaacson | B62D 55/305 |
| | | | | 305/145 |
| 6,164,736 A | * | 12/2000 | Warner | B62D 55/108 |
| | | | | 305/156 |
| 10,112,663 B1 | | 10/2018 | Kautsch | |

(Continued)

FOREIGN PATENT DOCUMENTS

CN        108974163 A   * 12/2018

OTHER PUBLICATIONS

English translation of CN-108974163-A.*
International Search Report dated Mar. 3, 2021.
Written Opinion Report dated Mar. 10, 2021.

*Primary Examiner* — S. Joseph Morano
*Assistant Examiner* — Alex Palmer
(74) *Attorney, Agent, or Firm* — Hahn Loeser & Parks LLP

(57) ABSTRACT

A track system for traction of a vehicle (e.g., an agricultural vehicle) in which the track system is designed to enhance traction and/or ride quality (e.g., reduce vibrations), when travelling on a soft and/or uneven ground area (e.g., an agricultural field) and/or when roading, by providing an improved suspension functionality (e.g., with plural articulations and resilient effects).

20 Claims, 25 Drawing Sheets

(56) References Cited

U.S. PATENT DOCUMENTS

| | | | | |
|---|---|---|---|---|
| 2016/0236733 A1* | 8/2016 | Tiede | .................... | B62D 55/112 |
| 2016/0362150 A1 | 12/2016 | Kirchmair et al. | | |
| 2018/0354568 A1* | 12/2018 | Gustafson | ............ | B62D 55/112 |
| 2019/0002043 A1 | 1/2019 | Tratta et al. | | |
| 2020/0148290 A1* | 5/2020 | Smith | .................... | B62D 55/14 |
| 2021/0221451 A1* | 7/2021 | Calcagni | ................ | B62D 55/10 |

* cited by examiner

TRACK SYSTEM FOR TRACTION OF A VEHICLE

CROSS-REFERENCE TO RELATED APPLICATION

This application claims priority from U.S. Patent Application 62/964,849 filed on Jan. 23, 2020 and hereby incorporated by reference herein.

FIELD

This disclosure relates generally to vehicles (e.g., agricultural vehicles or other industrial vehicles, etc.) and, more particularly, to track systems for traction of vehicles.

BACKGROUND

Off-road vehicles, including agricultural vehicles (e.g., tractors, harvesters, combines, etc.), construction vehicles (e.g., loaders, excavators, bulldozers, etc.), and forestry vehicles (e.g., feller-bunchers, knuckleboom loaders, etc.), military vehicles (e.g., combat engineering vehicles (CEVs), etc.), snowmobiles, and all-terrain vehicles (ATVs), may comprise track systems to enhance their traction and floatation on soft, slippery, and/or irregular grounds (e.g., soil, mud, etc.).

When an off-road vehicle such as an agricultural vehicle equipped track systems travels on a road (e.g., a crowned road) or on an agricultural field or another soft and/or uneven ground area, vibration may occur and load on tracks of the track systems may not be evenly distributed. This may create discomfort to a user of the off-road vehicle and sometimes lead to premature failure of components of the off-road vehicle.

For these and other reasons, improvements for track systems of vehicles would be welcomed.

SUMMARY

According to various aspects, this disclosure relates to a track system for traction of a vehicle (e.g., an agricultural vehicle) in which the track system is designed to enhance traction and/or ride quality (e.g., reduce vibrations), when travelling on a soft and/or uneven ground area (e.g., an agricultural field) and/or when roading, by providing an improved suspension functionality (e.g., with plural articulations and resilient effects).

For example, according to an aspect, this disclosure relates to a track system for traction of a vehicle. The track system comprises: a frame; a track that is elastomeric and comprises a ground-engaging outer surface and an inner surface opposite to the ground-engaging outer surface; a plurality of track-contacting wheels for driving and guiding the track around the track-contacting wheels. The track-contacting wheels include: a drive wheel for driving the track; and a plurality of roller wheels for rolling on a lower run of the track. The track system comprises a bogie carrying given ones of the roller wheels and movable relative to the frame to allow movement of axis of rotation of the given ones of the roller wheels relative to the frame, the bogie comprising a plurality of movable joints spaced apart in a longitudinal direction of the track system and configured to allow the movement of the axis of rotation of the given ones of the roller wheels relative to the frame. The track system comprises a resilient element disposed between the bogie and the frame, configured to resiliently affect the movement of the axis of rotation of the given ones of the roller wheels relative to the frame, and spaced apart from the movable joints in the longitudinal direction of the track system.

According to another aspect, this disclosure relates to a track system for traction of a vehicle. The track system comprises: a frame; a track that is elastomeric and comprises a ground-engaging outer surface and an inner surface opposite to the ground-engaging outer surface; a plurality of track-contacting wheels for driving and guiding the track around the track-contacting wheels. The track-contacting wheels include: a drive wheel for driving the track; and a plurality of roller wheels for rolling on a lower run of the track. The track system comprises a bogie carrying given ones of the roller wheels and movable relative to the frame to allow movement of axis of rotation of the given ones of the roller wheels relative to the frame, the bogie comprising a plurality of movable joints spaced apart in a longitudinal direction of the track system and configured to allow the movement of the axis of rotation of the given ones of the roller wheels relative to the frame. The given ones of the roller wheels include a first one of the roller wheels, a second one of the roller wheels, and a third one of the roller wheels that are spaced apart in the longitudinal direction of the track system.

According to another aspect, this disclosure relates to a track system for traction of a vehicle. The track system comprises: a frame; a track that is elastomeric and comprises a ground-engaging outer surface and an inner surface opposite to the ground-engaging outer surface; a plurality of track-contacting wheels for driving and guiding the track around the track-contacting wheels. The track-contacting wheels include: a drive wheel for driving the track; and a plurality of roller wheels for rolling on a lower run of the track. The track system comprises a bogie carrying given ones of the roller wheels and movable relative to the frame to allow movement of axis of rotation of the given ones of the roller wheels relative to the frame, the bogie comprising a plurality of movable joints spaced apart in a longitudinal direction of the track system and configured to allow the movement of the axis of rotation of the given ones of the roller wheels relative to the frame. The track system comprises a plurality of resilient elements disposed between the bogie and the frame, configured to resiliently affect the movement of the axis of rotation of the given ones of the roller wheels relative to the frame, spaced apart from one another in the longitudinal direction of the track system, and spaced apart from the movable joints in the longitudinal direction of the track system.

According to another aspect, this disclosure relates to a track system for traction of a vehicle. The track system comprises: a frame; a track that is elastomeric and comprises a ground-engaging outer surface and an inner surface opposite to the ground-engaging outer surface; a plurality of track-contacting wheels for driving and guiding the track around the track-contacting wheels. The track-contacting wheels include: a drive wheel for driving the track; and a plurality of roller wheels for rolling on a lower run of the track. The track system comprises a bogie carrying given ones of the roller wheels and movable relative to the frame to allow movement of axis of rotation of the given ones of the roller wheels relative to the frame, the bogie comprising a plurality of movable joints spaced apart in a longitudinal direction of the track system and configured to allow the movement of the axis of rotation of the given ones of the roller wheels relative to the frame. The movable joints are configured such that the movement of the axis of rotation of the given ones of the roller wheels relative to the frame comprises: rotational movement of the axis of rotation of the given ones of the roller wheels relative to the frame about at least one rotational axis transverse to the longitudinal direction of the track system; and rotational movement of the axis of rotation of the given ones of the roller wheels relative to the frame about at least one rotational axis transverse to a widthwise direction of the track system.

These and other aspects of this disclosure will now become apparent to those of ordinary skill in the art upon review of a description of embodiments in conjunction with accompanying drawings.

BRIEF DESCRIPTION OF DRAWINGS

A detailed description of embodiments is provided below, by way of example only, with reference to the accompanying drawings, in which.

It is to be expressly understood that the description and drawings are only for purposed of illustrating certain embodiments and are an aid for understanding. They are not intended to be and should not be limiting.

DETAILED DESCRIPTION OF EMBODIMENTS

Figure 1:
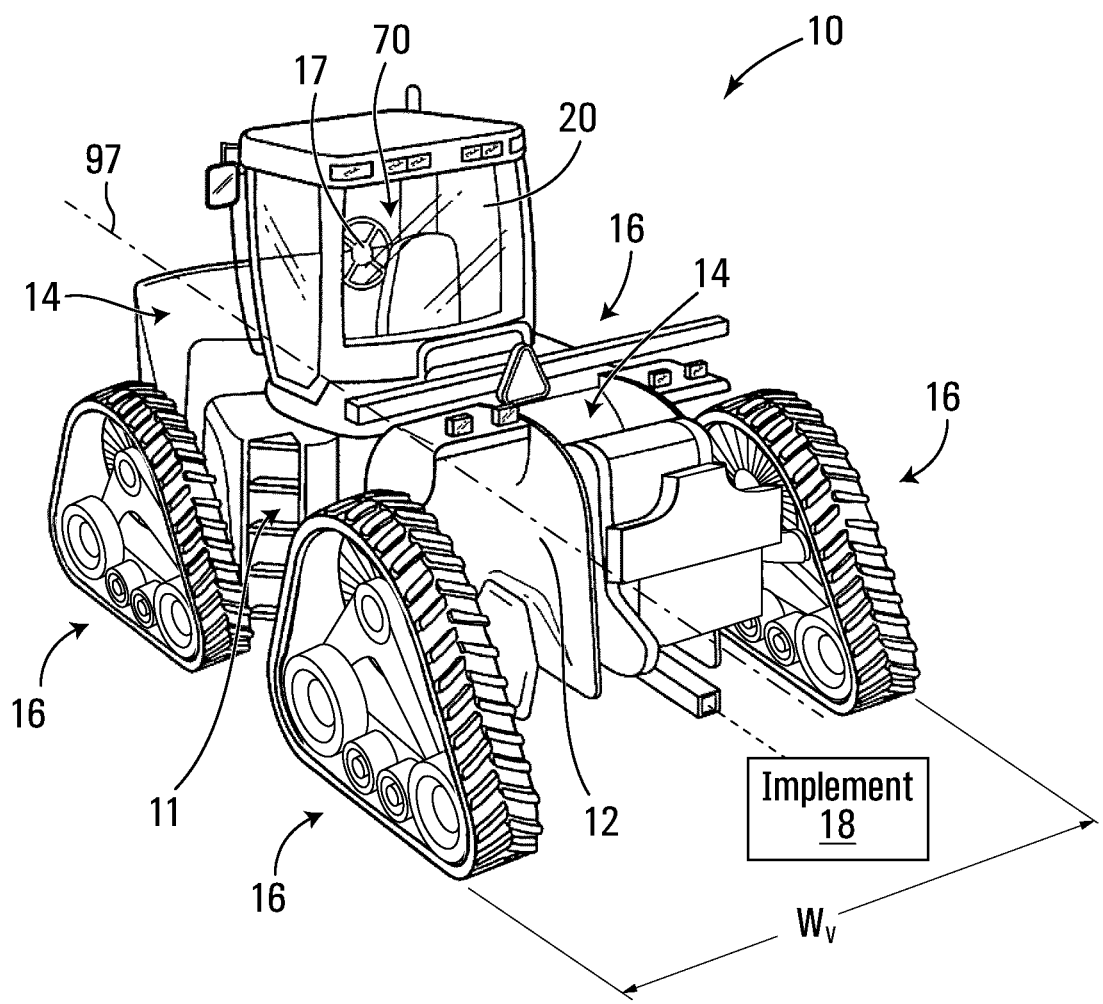
FIG. 1 shows an example of an agricultural vehicle comprising a track system in accordance with an embodiment.

FIG. 1 shows an embodiment of a vehicle 10 comprising track systems 16 including tracks 22 for traction of the vehicle 10 on a ground. In this embodiment, the vehicle 10 is an agricultural vehicle for performing agricultural work on an agricultural field 11. Specifically, in this example, the agricultural vehicle 10 is a tractor and the agricultural field 11 comprises soil. In other examples, the agricultural vehicle 10 may be a combine harvester, another type of harvester, or any other type of agricultural vehicle.

The agricultural vehicle 10 comprises a frame 12, a powertrain, the track systems 16 (which can be referred to as "undercarriages"), and an operator cabin 20 that enable an operator to move the agricultural vehicle 10 on the ground. The vehicle 10 can travel on the agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields.

In this embodiment, as further discussed later, the track systems 16 are configured to enhance traction and/or ride quality (e.g., reduce vibrations), when travelling on the agricultural field and/or when roading, by providing improved suspension functionality (e.g., with plural articulations and resilient effects for each of the track systems 16).

The powertrain is configured for generating motive power and transmitting motive power to the track systems 16 to propel the agricultural vehicle 10 on the ground. To that end, the powertrain comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems 16. That is, the powertrain transmits motive power generated by the prime mover 14 to one or more of the track systems 16 in order to drive (i.e., impart motion to) these one or more of the track systems 16. The powertrain may transmit power from the prime mover 14 to the track systems 16 in any suitable way. In this embodiment, the powertrain comprises a transmission between the prime mover 14 and final drive axles $56_1$, $56_2$ for transmitting motive power from the prime mover 14 to the track systems 16. The transmission may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18.

The user interface 70 also comprises an instrument panel (e.g., a dashboard) which provides indicators (e.g., a speedometer indicator, a tachometer indicator, etc.) to convey information to the operator.

Figure 2:
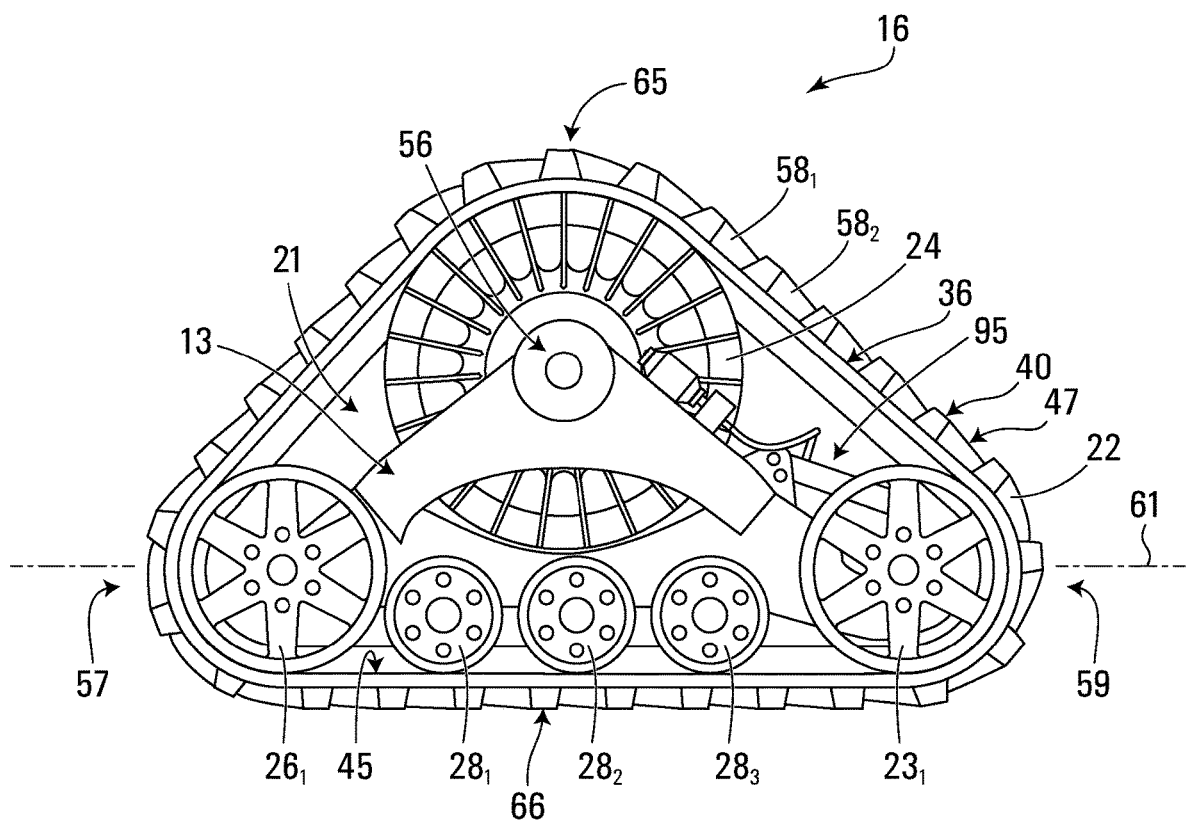
FIGS. 2 and 3 show a perspective view and a side view of the track system.
Figure 3:
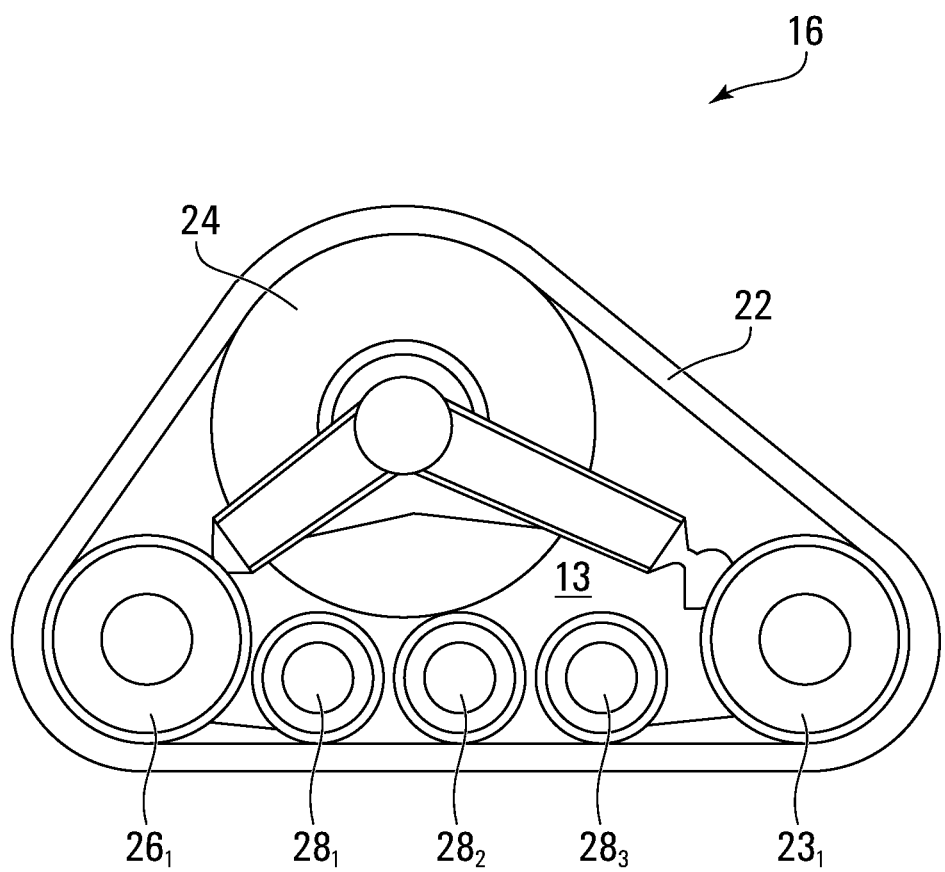
Figure 5:
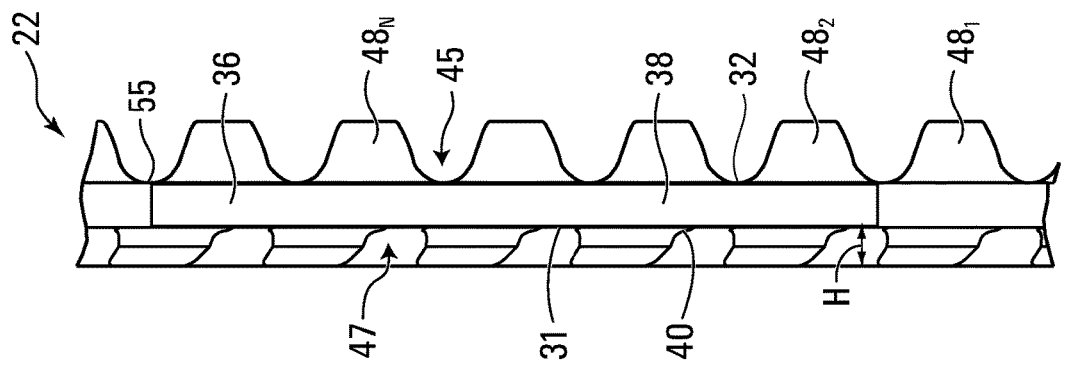
FIGS. 4 and 5 show a plan view and a side view of a track of the track system.
Figure 4:
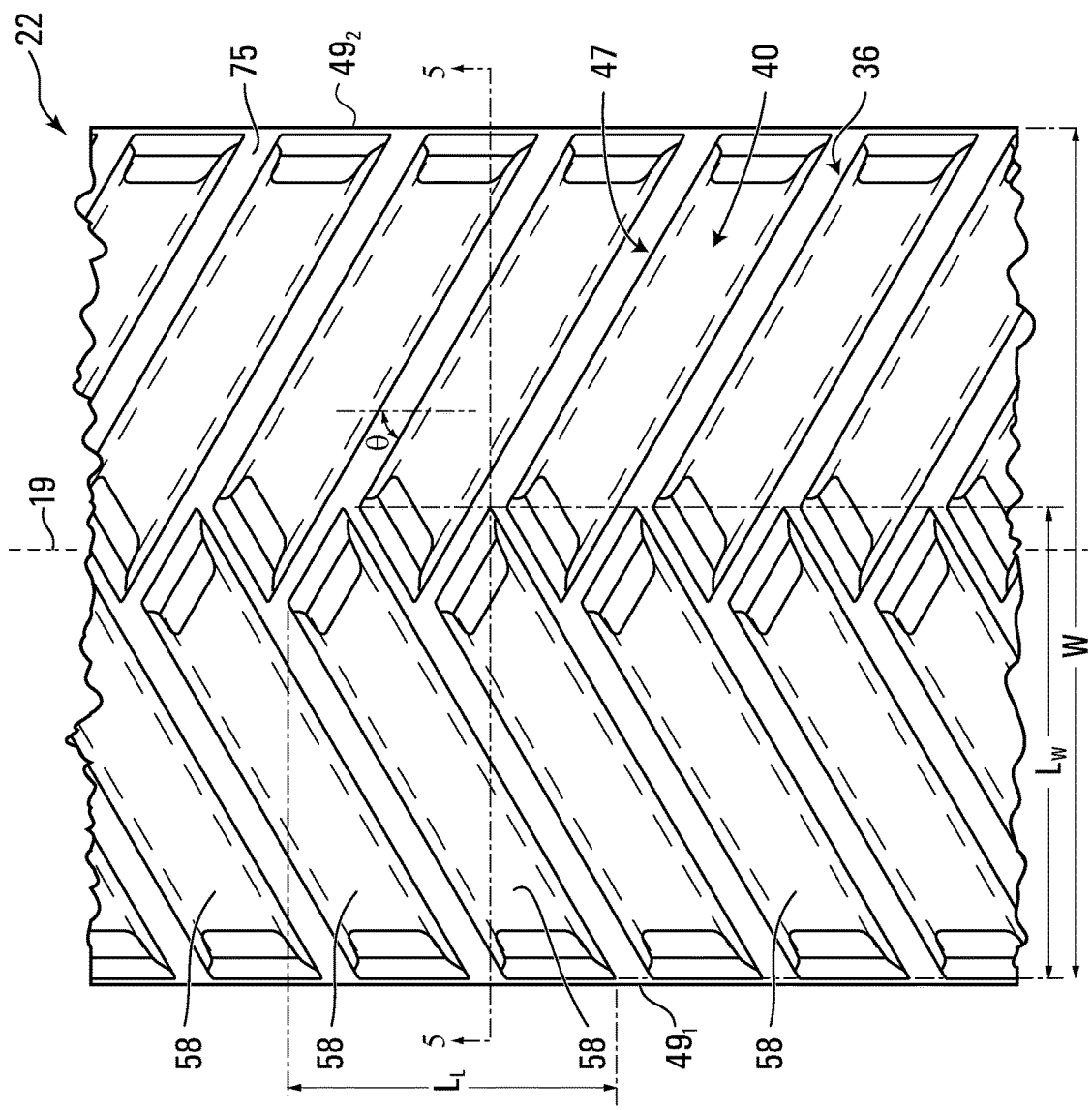
Figure 6:
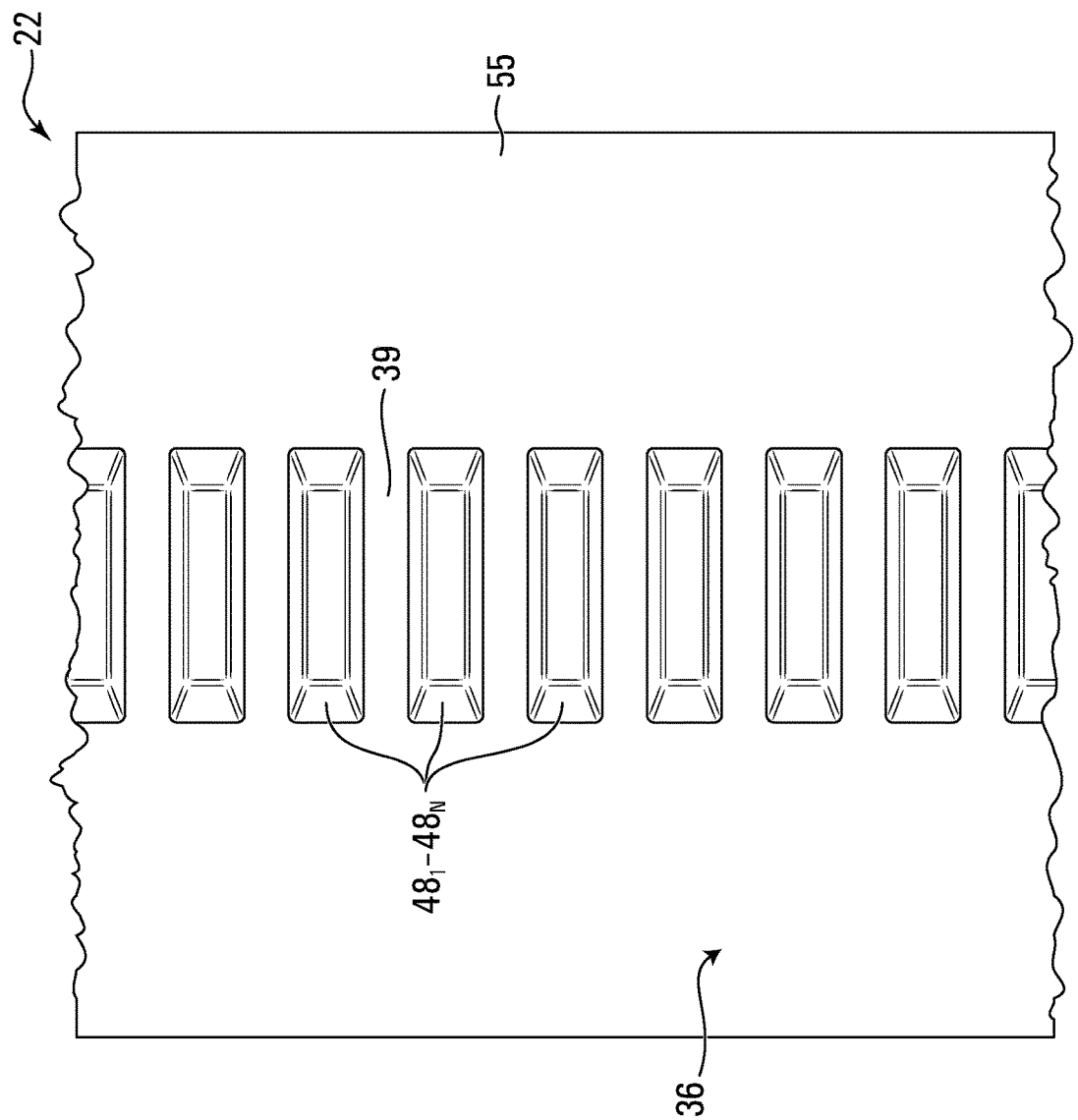
FIG. 6 shows an inside view of the track.
Figure 7:
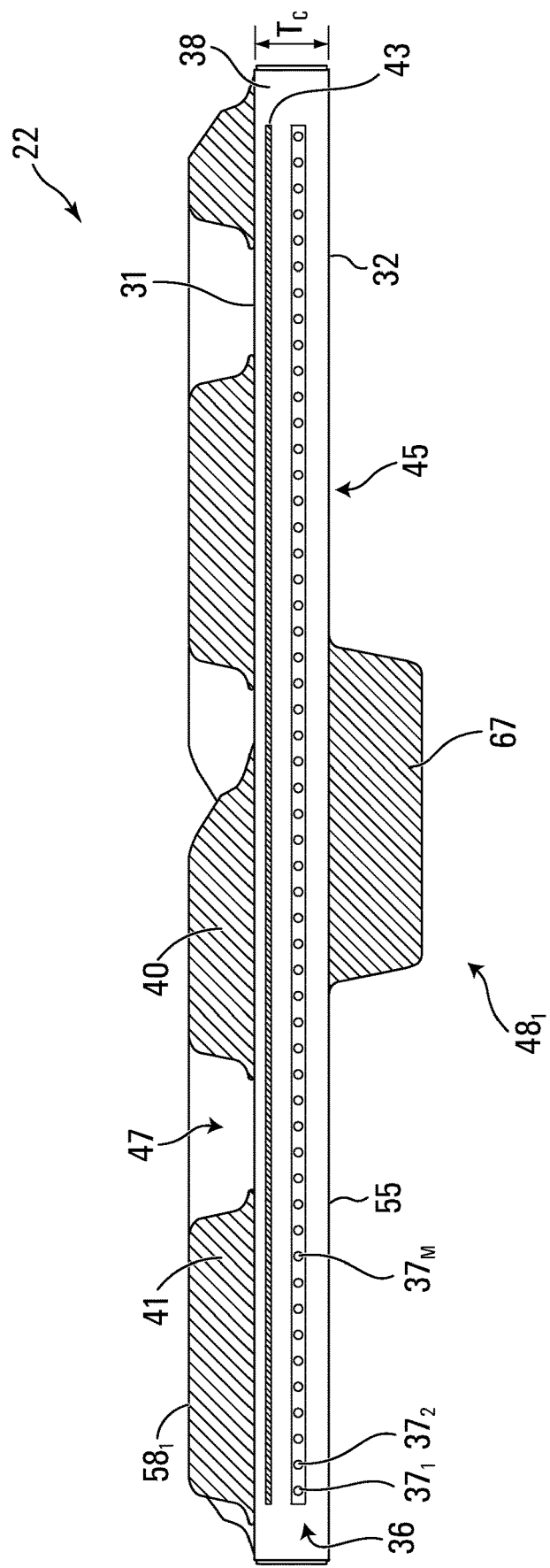
FIG. 7 shows a cross-sectional view of the track.

The track systems 16 engage the ground to propel the agricultural vehicle 10. As shown in FIGS. 2 and 3, each track system 16 comprises a track-engaging assembly 21 and a track 22 disposed around the track-engaging assembly 21. In this embodiment, the track-engaging assembly 21 comprises a plurality of track-contacting wheels which, in this example, includes a drive wheel 24 and a plurality of idler wheels that includes front (i.e., leading) idler wheels $23_1$, $23_2$, rear (i.e., trailing) idler wheels $26_1$, $26_2$, and roller wheels $28_1$-$28_6$. The track system 16 also comprises a frame 13 which supports various components of the track system 16, including the wheels $23_1$, $23_2$, $26_1$, $26_2$, $28_1$-$28_6$. In particular, in this embodiment, the frame 13 carries the idler wheels $23_1$, $23_2$, $26_1$, $26_2$ and the roller wheels $28_1$-$28_6$ are disposed between the front idler wheels $23_1$, $23_2$ and the rear idler wheels $26_1$, $26_2$ in a longitudinal direction of the track system 16. The track system 16 has the longitudinal direction and a first longitudinal end 57 and a second longitudinal end 59 that define a length of the track system 16 along a longitudinal axis 61 that defines the longitudinal direction of the track system 16. The track system 16 has a widthwise direction and a width that is defined by a width W of the track 22. The track system 16 also has a heightwise direction that is normal to its longitudinal direction and its widthwise direction.

Each of the front ones of the track systems 16 is steerable by the steering system 17 of the agricultural vehicle 10 in response to input of the user at the steering device to change an orientation of that track system relative to the frame 12 of the agricultural vehicle 10 in order to steer the agricultural vehicle 10 on the ground. To that end, each of the front ones of the track systems 16 is pivotable about a steering axis of the agricultural vehicle 10. An orientation of the longitudinal axis 61 of each of the front ones of the track systems 16 is thus adjustable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 3 to 6, the track 22 comprises an inner side 45, a ground-engaging outer side 47, and lateral edges $49_1$, $49_2$. The inner side 45 faces the wheels $23_1$, $23_2$, 24, $26_1$, $26_2$, $28_1$-$28_6$, while the ground-engaging outer side 47 engages the ground. A top run 65 of the track 22 extends between the longitudinal ends 57, 59 of the track system 16 and over the wheels $23_1$, $23_2$, 24, $26_1$, $26_2$, $28_1$-$28_6$, while a bottom run 66 of the track 22 extends between the longitudinal ends 57, 59 of the track system 16 and under the wheels $23_1$, $23_2$, 24, $26_1$, $26_2$, $28_1$-$28_6$. The bottom run 66 of the track 22 defines an area of contact 63 of the track 22 with the ground which generates traction and bears a majority of a load on the track system 16, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

In this embodiment, the track 22 is relatively narrow. For instance, this may be helpful to allow the track 22 to fit between rows of crops such as to leave the crops undisturbed when the agricultural vehicle 10 traverses an agricultural field. In turn, this may allow the agricultural field to have a greater0 crop density. For instance, in some embodiments, a ratio of a width $W_v$ of the agricultural vehicle 10 (measured between laterally-outwardmost ones of the track systems 16) over the width W of the track 22 may be at least 5, in some cases at least 7, in some cases at least 10, in some cases at least 12, and in some cases even more. For example, in some embodiments, the width W of the track 22 may no more than 30 inches, in some cases no more than 25 inches, in some cases no more than 20 inches, in some cases no more than 18 inches, in some cases no more than 16 inches, and in some cases even less (e.g., 14.5 inches). The width W of the track 22 may have any other suitable value in other embodiments.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels $23_1$, $23_2$, 24, $26_1$, $26_2$, $28_1$-$28$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the front and rear idler wheels $23_1$, $23_2$, $26_1$, $26_2$ and/or the roller wheels $28_1$-28 to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheels $23_1$, $23_2$, $26_1$, $26_2$ and/or the roller wheels $28_1$-$28_6$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheels $23_1$, $23_2$, $26_1$, $26_2$ and the roller wheels $28_1$-$28_6$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

Figure 8:
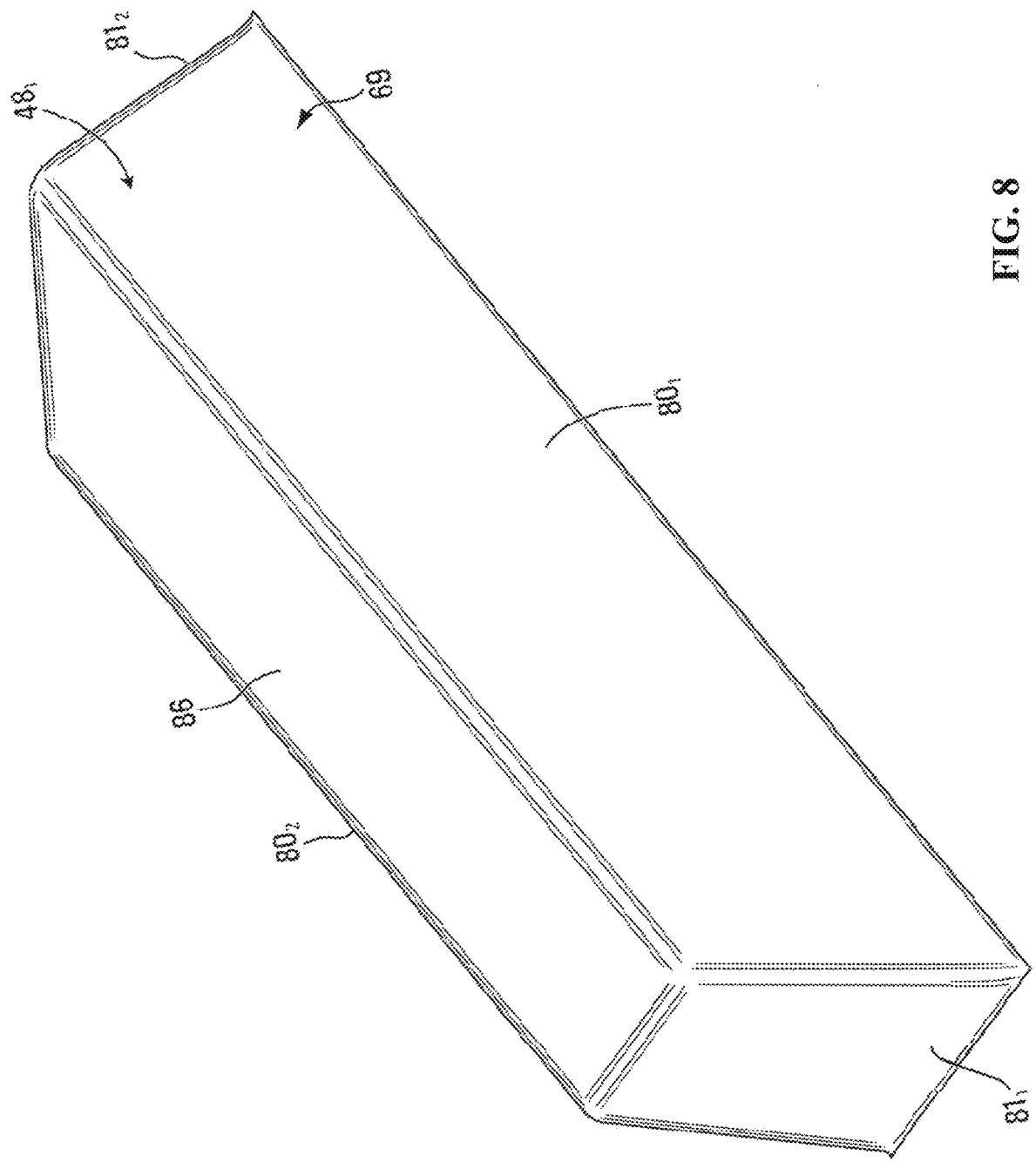
FIG. 8 shows a perspective view of a drive/guide projection of the track.

The drive/guide lugs $48_1$-$48_N$ may have any suitable shape. With additional reference to FIG. 8, each drive/guide lug $48_i$ has a periphery 69 which, in this embodiment, includes a front surface $80_1$, a rear surface $80_2$, two lateral surfaces $81_1$, $81_2$, and a top surface 86. The front surface $80_1$ and the rear surface $80_2$ are opposed to one another along the longitudinal direction of the track 22. In this embodiment where the drive/guide lug $48_i$ is used to drive the track 22, each of the front surface $80_1$ and the rear surface $80_2$ constitutes a drive surface which can be contacted by a drive member of the drive wheel 24 that pushes against it to impart motion to the track 22. The two lateral surfaces $81_1$, $81_2$ are laterally opposed and may contact the roller wheels $28_1$-$28_6$, the drive wheel 24 and/or the idler wheel 26 such as to prevent excessive lateral movement of the track 22 relative the wheels and to thus prevent de-tracking. Although it has a certain shape in this embodiment, the periphery 69 of the drive/guide lug $48_i$ may have various other shapes in other embodiments.

Each drive/guide lug $48_i$ has a front-to-rear dimension $L_L$ in the longitudinal direction of the endless track 22 and a side-to-side dimension $L_W$ in the widthwise direction of the endless track 22. In some cases, the front-to-rear dimension $L_L$ may be a width of the drive/guide lug $48_i$ while the side-to-side dimension $L_W$ may be a length of the drive/guide lug $48_i$. In other cases, the front-to-rear dimension $L_L$ may be a length of the drive/guide lug $48_i$ while the side-to-side dimension $L_W$ may be a width of the drive/guide lug $48_i$. In yet other cases, the front-to-rear dimension $L_L$ and the side-to-side dimension $L_W$ may be substantially the same. The drive/guide lug $48_i$ also has a height H.

In this embodiment, the drive/guide lug $48_i$ is configured to pass between respective pairs of the idler wheels $23_1$, $23_2$, $26_1$, $26_2$ and/or the roller wheels $28_1$-$28_6$ when they are aligned with one another, such that the lateral surfaces $81_1$, $81_2$ of each drive/guide lug $48_i$ face respecting ones of the idler wheels $23_1$, $23_2$, $26_1$, $26_2$ and/or the roller wheels $28_1$-$28_6$ when they are aligned with one another.

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain of the agricultural vehicle 10 can rotate a final drive axle $56_i$ which causes rotation of the drive wheel 24, which in turn imparts motion to the track 22.

Figure 9:
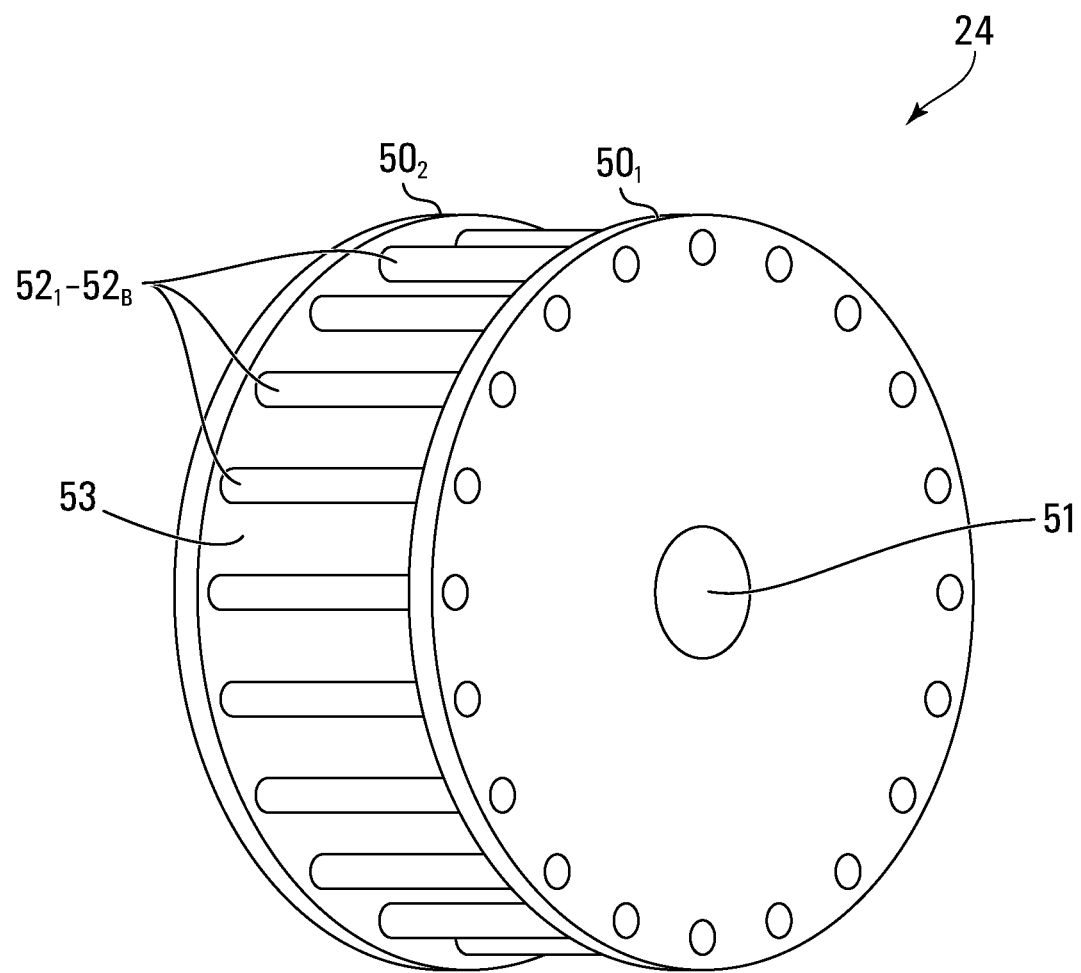
FIG. 9 shows a drive wheel of a track-engaging assembly of the track system.

With additional reference to FIG. 9, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

Figure 10:
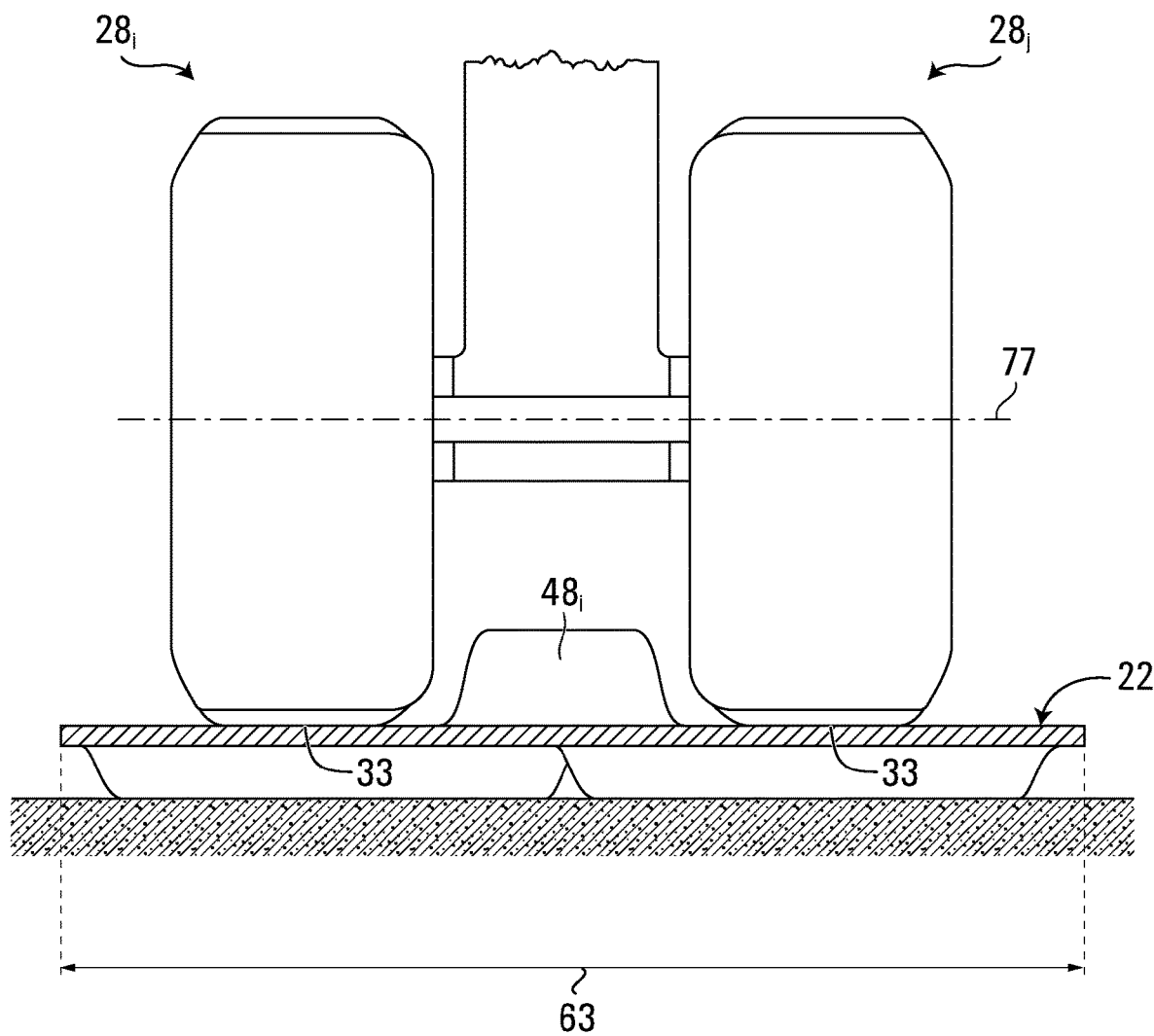
FIG. 10 shows mid-rollers of the track-engaging assembly engaging an inner side the track.
Figure 11:
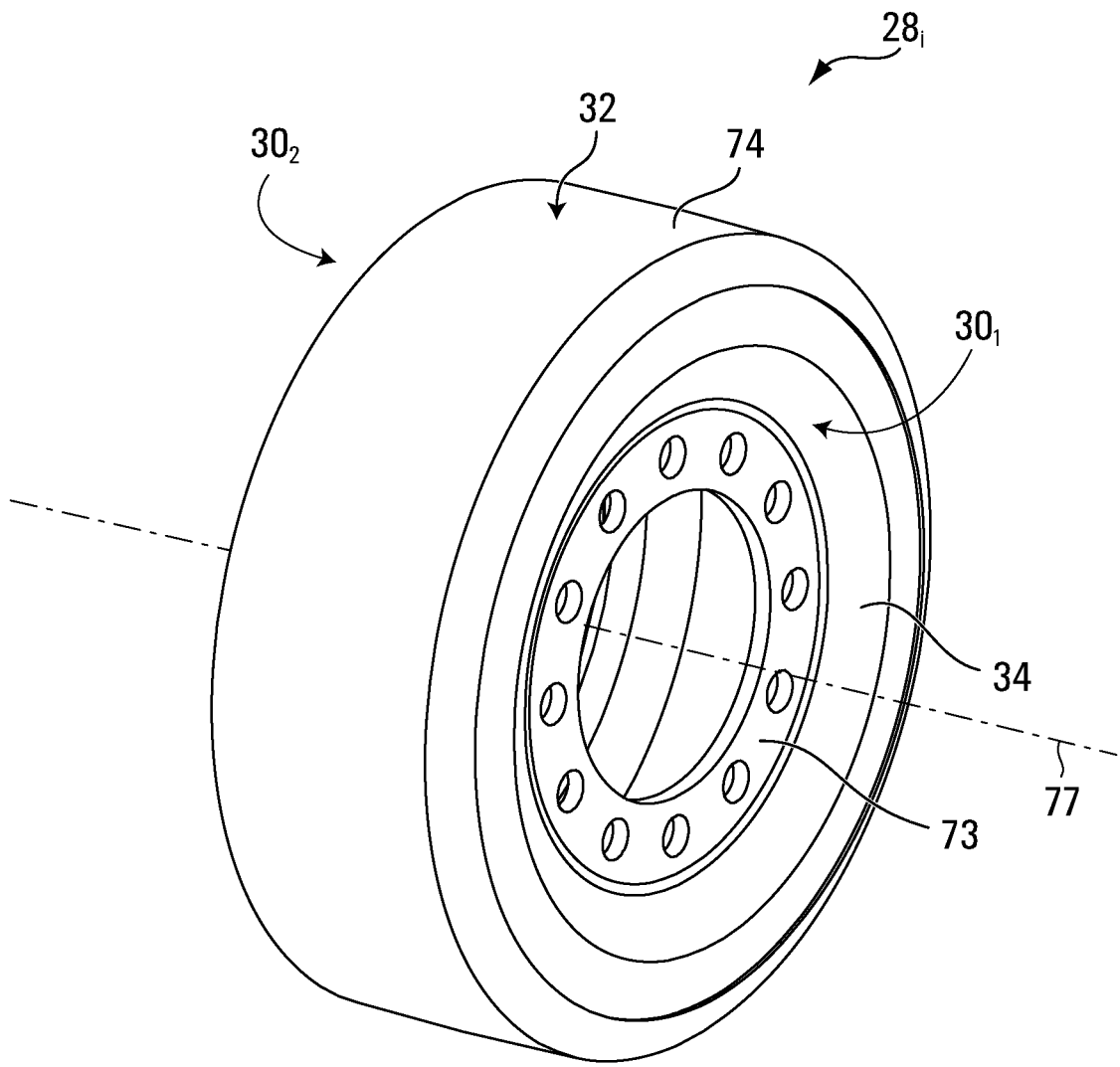
FIGS. 11 and 12 show perspective views of a mid-roller of the track-engaging assembly.
Figure 12:
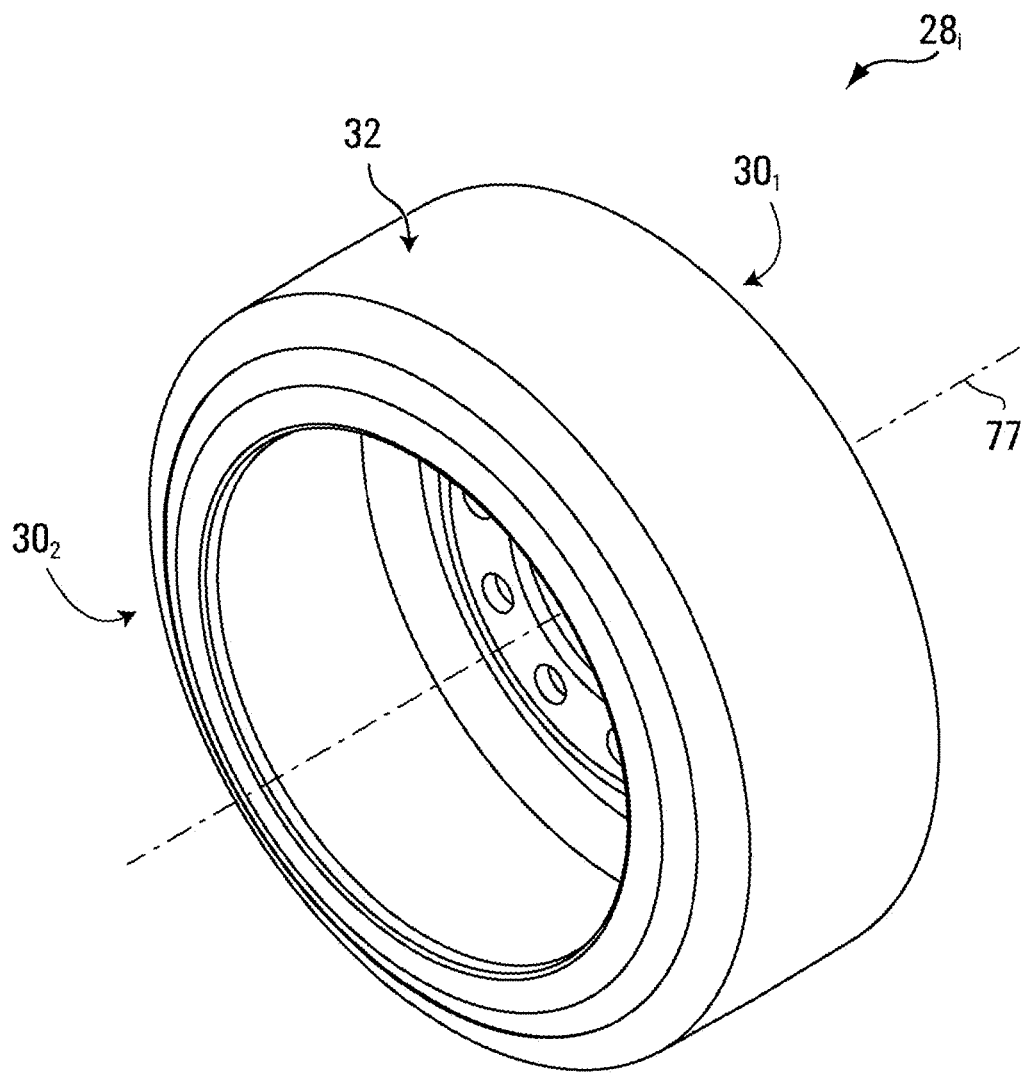
Figure 13:
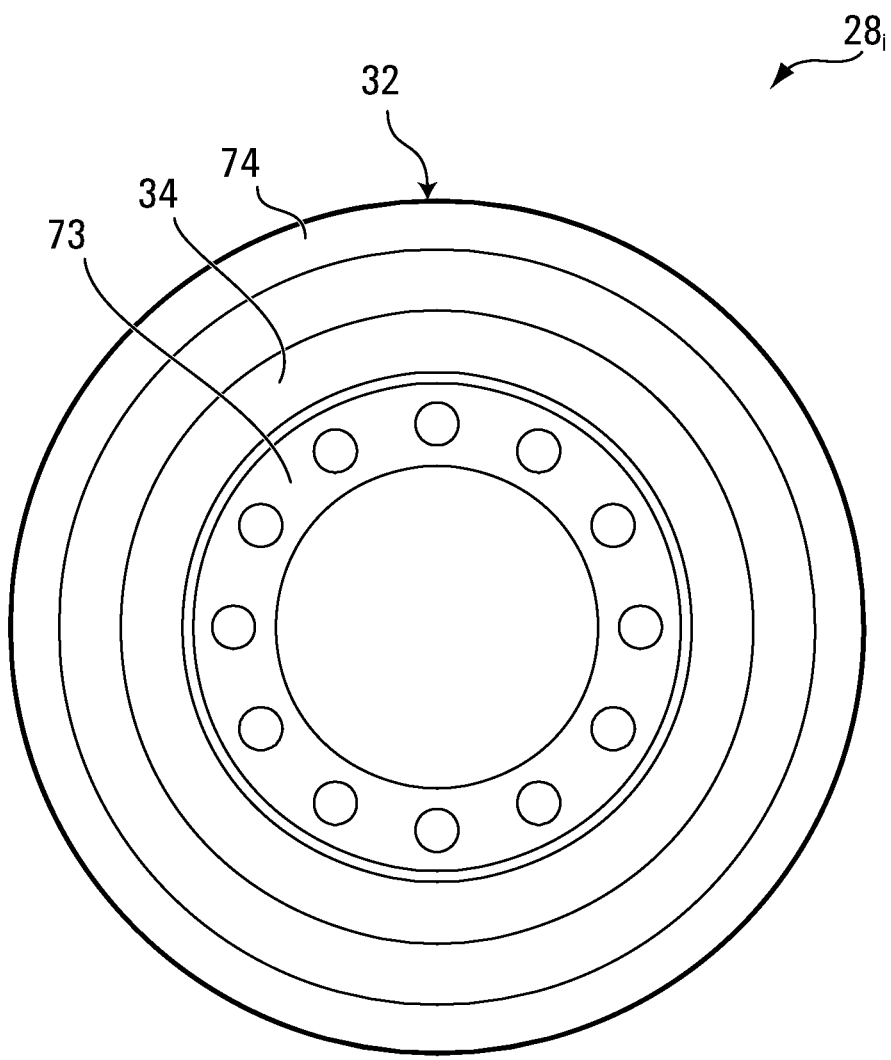
FIGS. 13 and 14 show a front view and a side view of the mid-roller.
Figure 14:
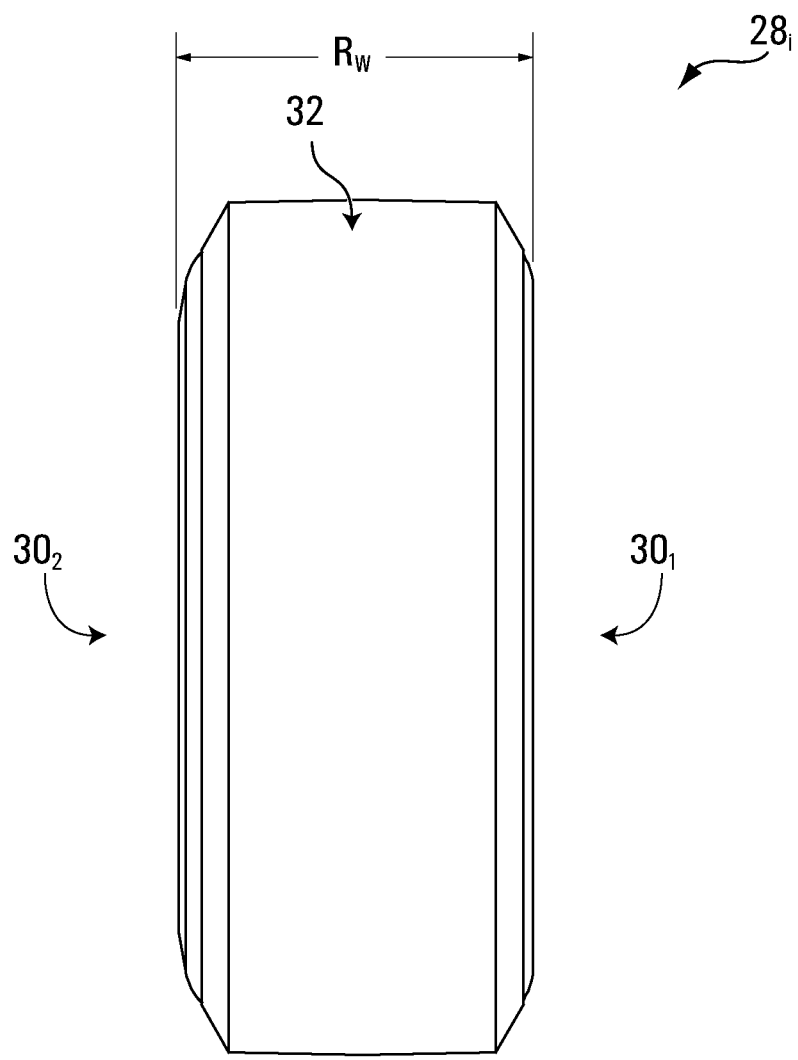

The front idler, rear idler, and roller wheels $23_1$, $23_2$, $26_1$, $26_2$, $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels $23_1$, $23_2$, $26_1$, $26_2$ maintain the track 22 in tension and help to support part of the weight of the agricultural vehicle 10 on the ground via the track 22. As shown in FIG. 10, the roller wheels $28_1$-$28_6$ roll on a rolling path 33 of the inner side 45 of the track 22 along the bottom run 66 of the track 22 to apply the bottom run 66 on the ground. In this case, as they are located between frontmost and rearmost ones of the wheels of the track system 16, the roller wheels $28_1$-$28_6$ can be referred to as "mid-rollers".

With additional reference to FIGS. 11 to 14, each mid-roller $28_i$ has an axis of rotation 77 and comprises a hub portion 73, a rim portion 74, and a radially-extending portion 34 between the hub portion 73 and the rim portion 74. The hub portion 73 is an inner portion of the mid-roller $28_i$ which is associated with a hub 75 receiving an axle for the mid-roller $28_i$. The rim portion 74 is an outer portion of the mid-roller $28_i$ which contacts the inner side 45 of the endless track 22. The radially-extending portion 34 is an intermediate portion of the mid-roller $28_i$ which extends radially between the hub portion 73 and the rim portion 74.

The mid-roller $28_i$ comprises a pair of lateral sides $30_1$, $30_2$ opposite one another and a peripheral side 32 between the lateral sides $30_1$, $30_2$. The peripheral side 32 rolls on the inner side 45 of the track 22 to apply the bottom run 66 of the track 22 on the ground. More particularly, in this embodiment, the mid-roller $28_i$ rolls on the rolling path 33 which is delimited by some of the drive/guide lugs $48_1$-$48_N$ such that, as the mid-roller $28_i$ rolls, these drive/guide lugs pass next to the mid-roller $28_i$.

In this embodiment, the mid-rollers $28_1$-$28_6$ may be disposed in corresponding pairs that are spaced apart in the longitudinal direction of the track system 16, and the mid-roller $28_i$ may engage a significant extent of the width W of the track 22. For example, in some embodiments, a ratio of a width $R_W$ of the mid-roller $28_i$ over the width W of the track 22 may be at least 0.2, in some cases at least 0.3, in some cases at least 0.4, and in some cases even more.

Moreover, as shown in FIG. 2, the track system 16 may comprise a tensioner 95 configured to control a tension of the track 22. For instance, in this embodiment, the tensioner 95 comprises an actuator mounted at one end to the frame 13 of the track system 16 and at another end to a hub of the front idler wheels $23_1$, $23_2$. This allows the tensioner 95 to modify a distance between the front idler wheels $23_1$, $23_2$ and the rear idler wheels $26_1$, $26_2$ in the longitudinal direction of the track system 16, thereby affecting the tension of the track 22.

Figure 15:
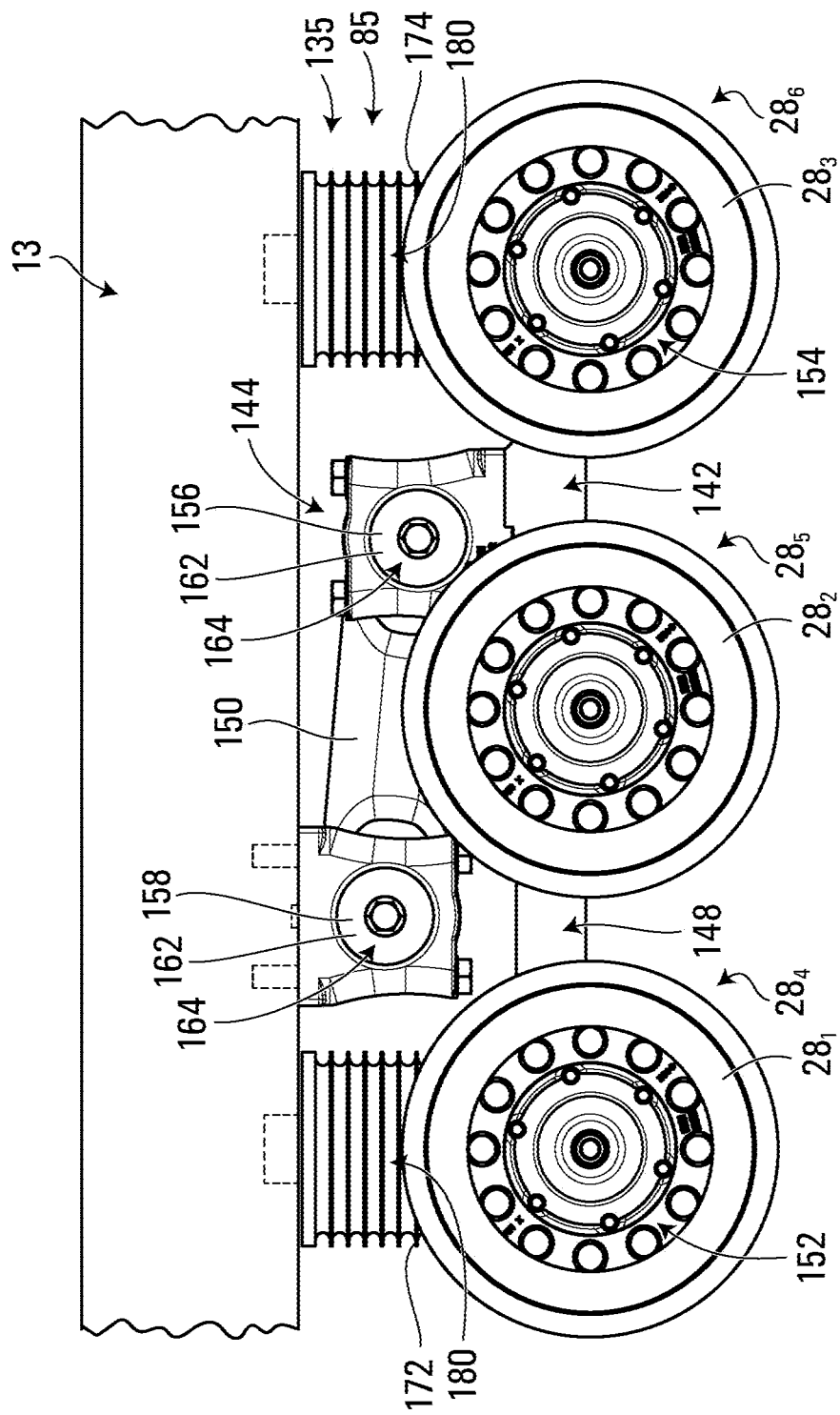
FIG. 15 shows a partial cross-sectional side view of a lower portion of the track system, including a bogie carrying the mid-rollers and a resilient device disposed between the bogie and a frame of the track system.
Figure 16:
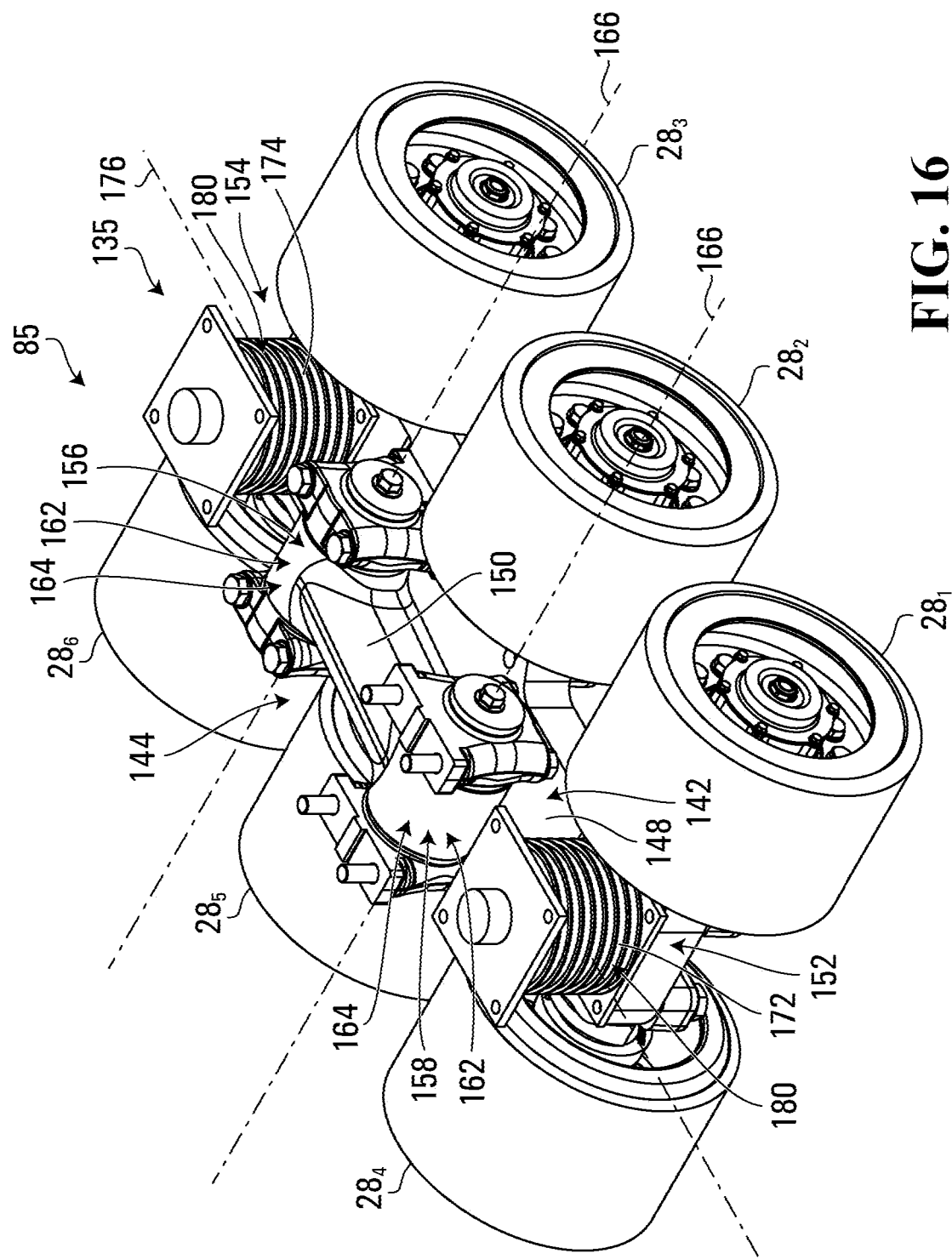
FIG. 16 shows a perspective view of the bogie and the resilient device.

In addition, in this embodiment, as shown in FIGS. 15 and 16, the track system 16 comprises a bogie 85 mounted to the frame 13 of the track system 16 and resilient member 135 disposed between the bogie 85 and the frame 13.

The bogie 85 is a wheel-carrying subassembly configured to carry at least some of (e.g., some of, a majority of or an entirety of) the mid-rollers $28_1$-$28_6$. Specifically, in this embodiment, the bogie carries all the mid-rollers $28_1$-$28_6$.

Figure 17:
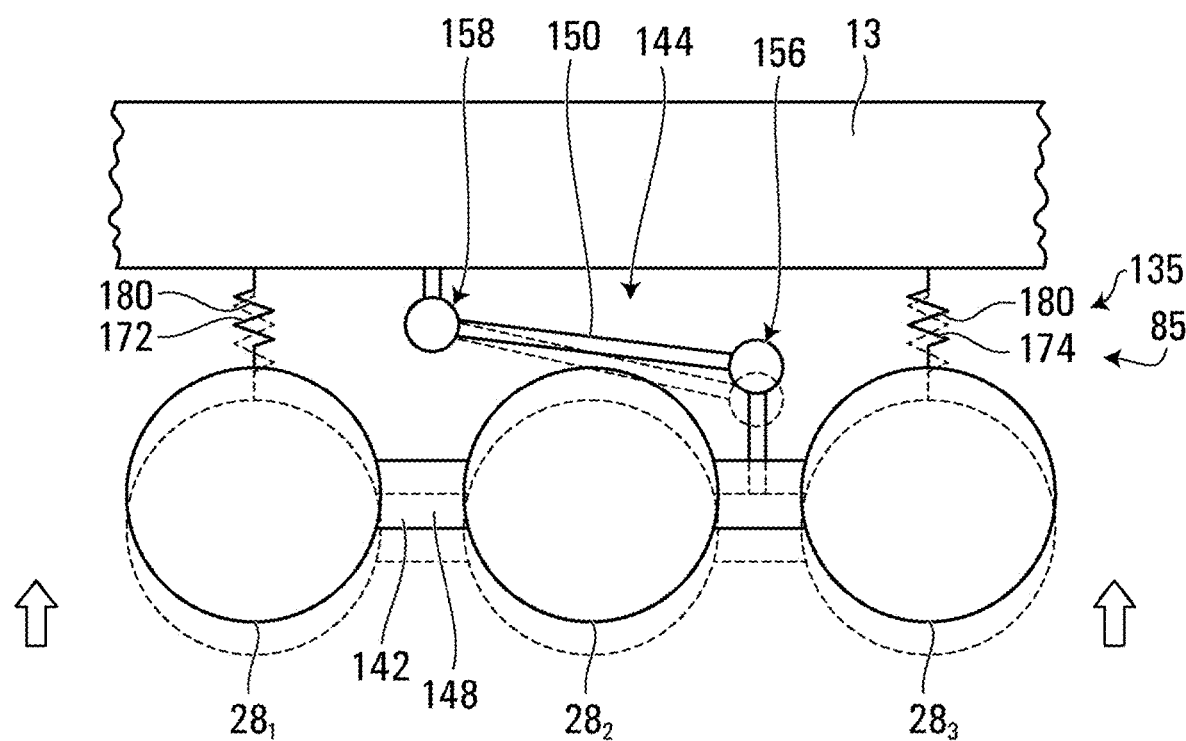
FIG. 17 shows a translational movement of the bogie and the resilient device in response to a load.
Figure 18:
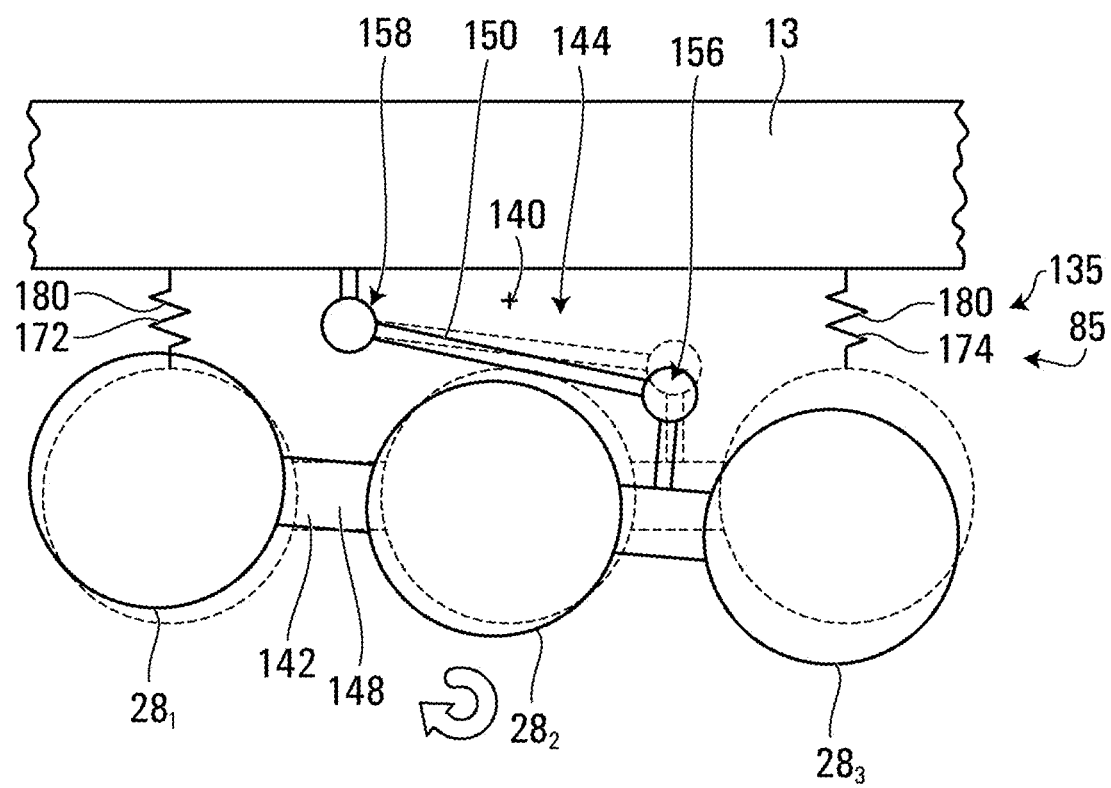
FIG. 18 shows a rotational movement of the bogie and the resilient device in response to another load.

With additional reference to FIGS. 17 and 18, in this embodiment, the bogie 85 is movable relative to the frame 13 to allow movement of the axes of rotation 77 of the mid-rollers $28_1$-$28_6$ relative to the frame 13. In this embodiment, the movement of the axes of rotation 77 of the mid-rollers $28_1$-$28_6$ relative to the frame 13 comprises rotational movement of the axes of rotation 77 of the mid-rollers $28_1$-$28_6$ relative to the frame 13 about at least one rotational axis 166 transverse to the longitudinal direction of the track system 16. In this example, the at least one rotational axis 166 transverse to the longitudinal direction of the track system 16 is substantially parallel to the widthwise direction of the track system 16, such that the mid-rollers $28_1$-$28_6$ can undergo a "pitch" motion.

In particular, in this embodiment, the bogie 85 is moveable relative to the frame 13 such that a longitudinal axis of the bogie 85 is movable about a pivot axis 140 that is transversal to the longitudinal direction of the track system 16. Specifically, in this embodiment, the pivot axis 140 is substantially parallel to the widthwise direction of the track system 16 (i.e., a component of the pivot axis 140 in the widthwise direction of the track system 16 is comparable with or greater than components of the pivot axis 140 in the longitudinal and heightwise direction of the track system 16, or the components of the pivot axis 140 in the longitudinal and heightwise direction of the track system 16 are null).

In this embodiment, the pivot axis 140 is a virtual pivot axis. That is, the virtual pivot axis 140 is an imaginary pivot axis about which each mid-roller $28_i$ can be viewed as effectively pivoting, even though there is not necessarily an actual physical pivot where it is located.

The pivot axis 140 is movable and may be located anywhere relative to the frame 13. For instance, the pivot axis 140 may be located relatively near the frame 13, resulting in a mostly rotational movement of the bogie 85 relative to the frame, and the pivot axis 140 may be located relatively far from the frame 13, resulting in a mostly translational movement of the bogie 85 relative to the frame 13.

More particularly, in this embodiment, the bogie 85 comprises a base 142 and a linkage mechanism 144 that implements the virtual pivot axis 140.

The base 142 may be a wheel-carrying base that carries the mid-rollers $28_1$-$28_6$. In particular, in this embodiment, the wheel-carrying base 142 is elongated in the longitudinal direction of the track system 16 which comprises a first longitudinal end portion 152 and a second longitudinal end portion 154 opposite the first longitudinal end portion 152. The wheel-carrying base 142 comprises a beam 148 which connects, supports and carries the mid-rollers $28_1$-$28_6$.

The linkage mechanism 144 may comprise a suspension link 150 that extends between the wheel-carrying base 144 and the frame 13 of the track system 16, and a plurality of movable joints 156, 158 spaced apart in the longitudinal direction of the track system 16 and configured to allow the movement of the axis of rotation 77 of the mid-rollers $28_1$-$28_6$ relative to the frame 13. Specifically, in this embodiment, the linkage mechanism 144 comprises: the movable joint 156 disposed between the wheel-carrying base 142 and the suspension link 150 rotatably connecting the wheel-carrying base 142 with the suspension link 150; and the movable joint 158 disposed between the suspension link 150 and the frame 13, rotatably connecting the suspension link 150 with the frame 13, and being spaced apart in the longitudinal direction of the track system 16 from the movable joint 156.

Each one of the movable joints 156, 158 implements a rotational axis 166 about which the bogie 85 can rotate relative to the frame 13. In particular, each one of the movable joints 156, 158 comprises a pivot 162 defining its rotational axis 166. The rotational axis 166 is transversal to the longitudinal direction of the track system 16. Specifically, in this embodiment, the rotational axis 166 are configured to be parallel to the widthwise direction of the track system 16. The combined action of the movable joints 156, 158 causes translation of the wheel-carrying base 142 and the mid-rollers $28_1$-$28_6$ relative to the frame 13 and/or rotation of the wheel-carrying base 142 and the mid-rollers $28_1$-$28_6$ relative to the frame 13 about the virtual pivot axis 140.

In this embodiment, each one of the movable joints 156, 158 further includes a resilient component 164, which may include a resilient bushing (e.g., a rubber bushing), a spring and/or a damper (e.g., a shock absorber), to contribute to maintaining a position of the bogie 85 relative to the frame 13 and/or to manage (i.e., absorb and/or dampen) vibrations from the bogie 85 and/or the mid-rollers $28_1$-$28_6$. The resilient components 164 are configured to resiliently change in configuration to absorb and/or dampen vibrations and may be disposed at respective ones of the pivots 162.

More particularly, in this embodiment, the resilient component 164 of each of the movable joints 156, 158 may be configured such that the movement of the axes of rotation 77 of the mid-rollers $28_1$-$28_6$ relative to the frame 13 may comprise rotational movement of the axes of rotation 77 of the mid-rollers $28_1$-$28_6$ relative to the frame 13 about at least one rotational axis 176 transverse to the widthwise direction of the track system 16. In this example, the at least one rotational axis 176 transverse to the widthwise direction of the track system 16 may be substantially parallel to the longitudinal direction of the track system 16, such that the mid-rollers $28_1$-$28_6$ can undergo a "roll" or "laterally-oscillating" motion.

The resilient member 135 is configured to affect the movement of the axes of rotation 77 of the mid-rollers $28_1$-$28_6$ relative to the frame 13 by changing from a first configuration to a second configuration in response to a load and recover the first configuration in response to removal of the load. In this embodiment, the resilient member 135 comprises a first resilient element 172 disposed between the bogie 85 and the frame 13 and located at the first longitudinal end portion 152 of the wheel-carrying base 142, and a second resilient element 174 disposed between the bogie 85 and the frame 13 and located at the second longitudinal end portion 154 of the wheel-carrying base 142. Each of the resilient elements 172, 174 may be configured to resiliently affect the movement of the axis of rotation 77 of the mid-rollers $28_1$-$28_6$ relative to the frame 13, and the resilient elements 172, 174 are spaced apart from the movable joints 156, 158 in the longitudinal direction of the track system 16.

In this embodiment, each of the resilient elements 172, 174 may comprise a spring 180. Specifically, in this embodiment, the spring 180 is metallic in that it comprises metallic material. More specifically, in this embodiment, the spring 180 is a tower spring. In this embodiment, the springs 180 of the resilient elements 172, 174 are configured to be at rest when the vehicle 10 rests on an horizontal surface. In this embodiment, the springs 180 of the resilient elements 172, 174 are identical relative to one another (e.g., have the same k-value).

The track system 16 may be implemented in any other suitable manner in other embodiments.

Figure 19:
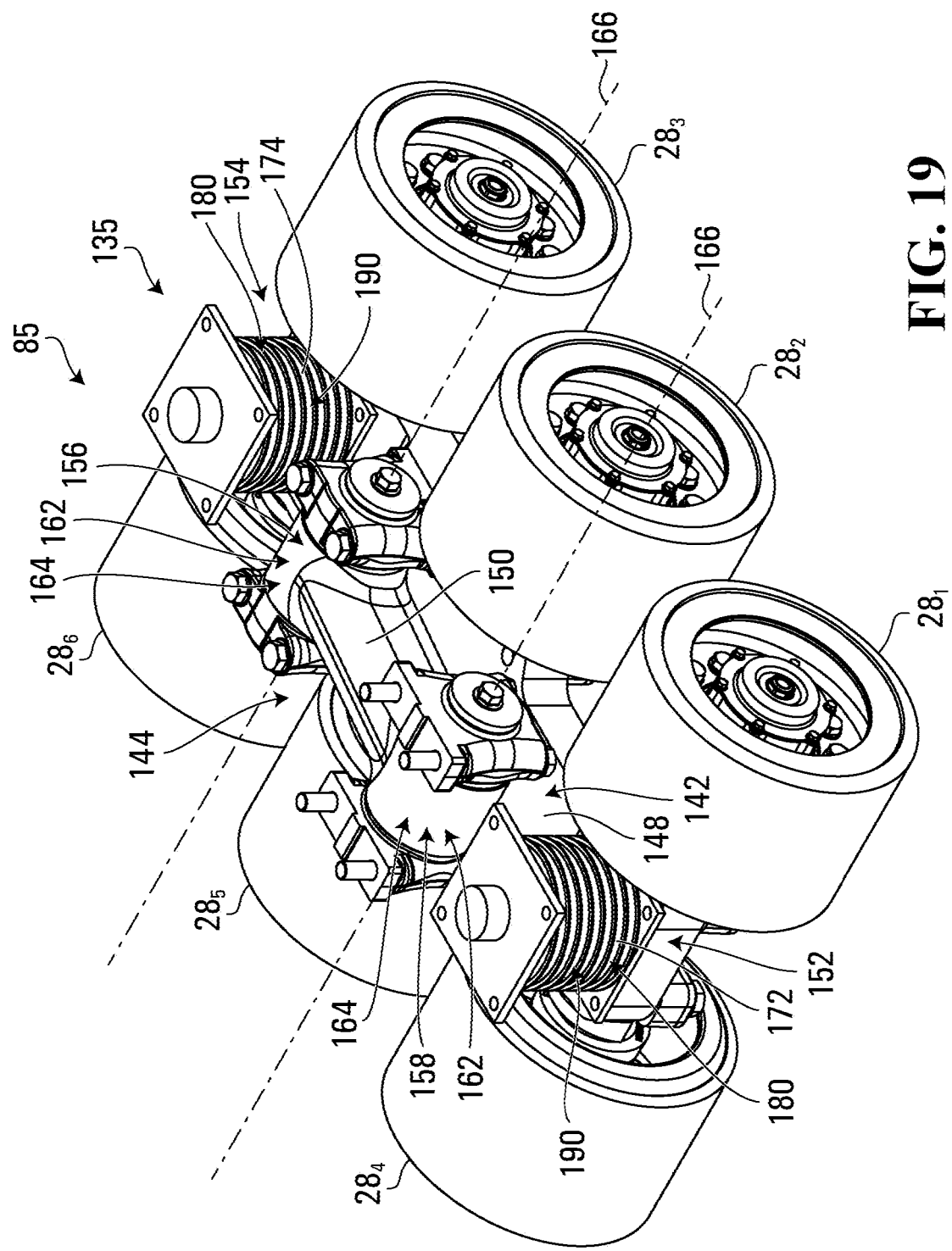
FIGS. 19 to 24 show variants of the bogie and the resilient device.
Figure 20:
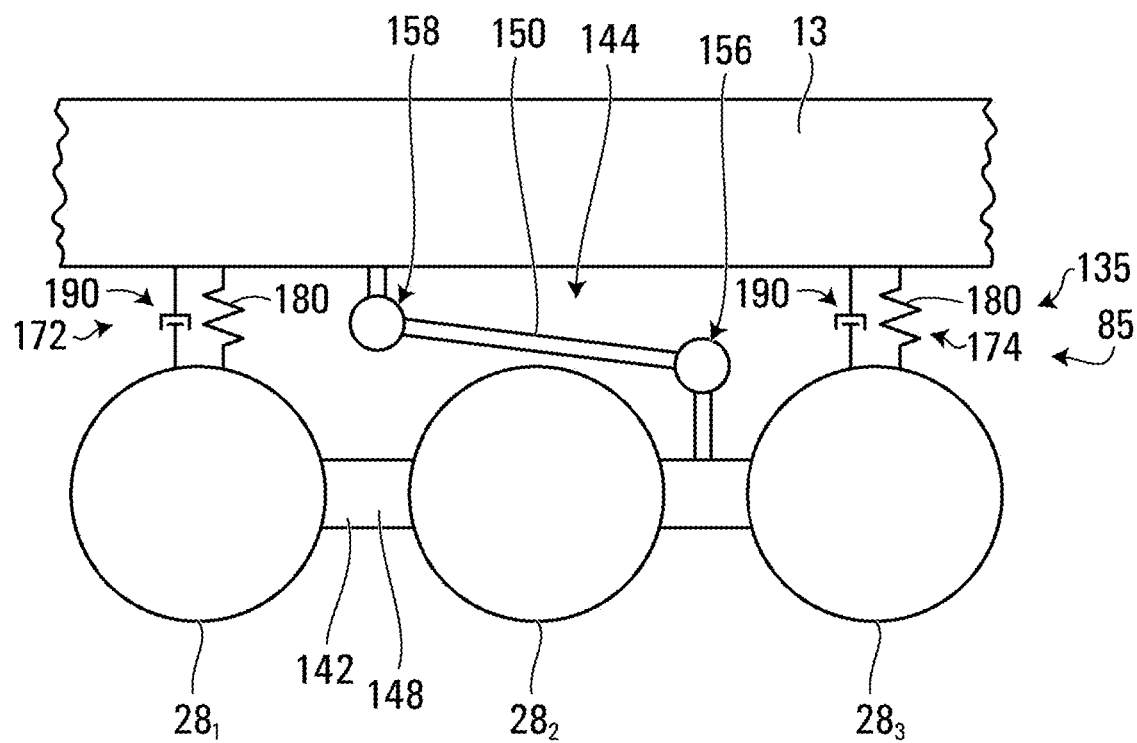

For example, in some embodiments, as shown in FIGS. 19 and 20, each one of the resilient elements 172, 174 may comprise a piston-cylinder arrangement 190 to contribute to maintaining a position of the bogie 85 relative to the frame 13 and to manage (i.e., absorb and/or dampen) vibrations from the bogie 85 and/or the mid-rollers $28_1$-$28_6$.

As another example, in some embodiments, the springs 180 of the resilient elements 172, 174 are configured to be at compressed when the vehicle 10 rests on a horizontal surface. In order to achieve this, the springs 180 of the resilient elements 172, 174 may be pre-loaded (e.g., pre-compressed).

As another example, in some embodiments, the springs 180 of the resilient elements 172, 174 may be different from one another. For instance, a k-value of the spring 180 of the first resilient element 172 configured to be oriented towards the front of the vehicle 10 may be greater than a k-value of the spring 180 of the second resilient element 174 configured to be oriented towards the rear of the vehicle 10. In other examples, inversely, the k-value of the spring 180 of the first resilient element 172 configured to be oriented towards the front of the vehicle 10 may be smaller than the k-value of the spring 180 of the second resilient element 174 configured to be oriented towards the rear of the vehicle 10.

As another example, in some embodiments, the bogie 85 may not be rotatable about the at least one rotational axis 176 transverse to the widthwise direction of the track system 16 and/or substantially parallel to the longitudinal direction of the track system 16. In this embodiment, such that the mid-rollers $28_1$-$28_6$ are restricted and cannot undergo a "roll" or "laterally-oscillating" motion. This may be achieved by configuring the resilient element of the movable joints 156, 158 to restrict the axes of rotation 77 of the mid-rollers $28_1$-$28_6$ from rotating about a rotational axis transverse to the widthwise direction of the track system 16.

As another example, in some embodiments, the bogie 85 may comprise a suspension system 190 allowing the bogie 85 to have a significant rolling motion relative to the frame 13, i.e., to rotate relative to the frame 13 about a pivot axis $P_L$ that is transversal to the widthwise direction of the track system 16 and that is parallel to the longitudinal direction of the track system 16, simultaneously to having the linkage mechanism 144 allowing the bogie 85 to rotate relative to the frame 13 about the virtual pivot axis 140 that is transversal to the longitudinal direction of the track system 16 and that is parallel to the widthwise direction of the track system 16.

Figure 21:
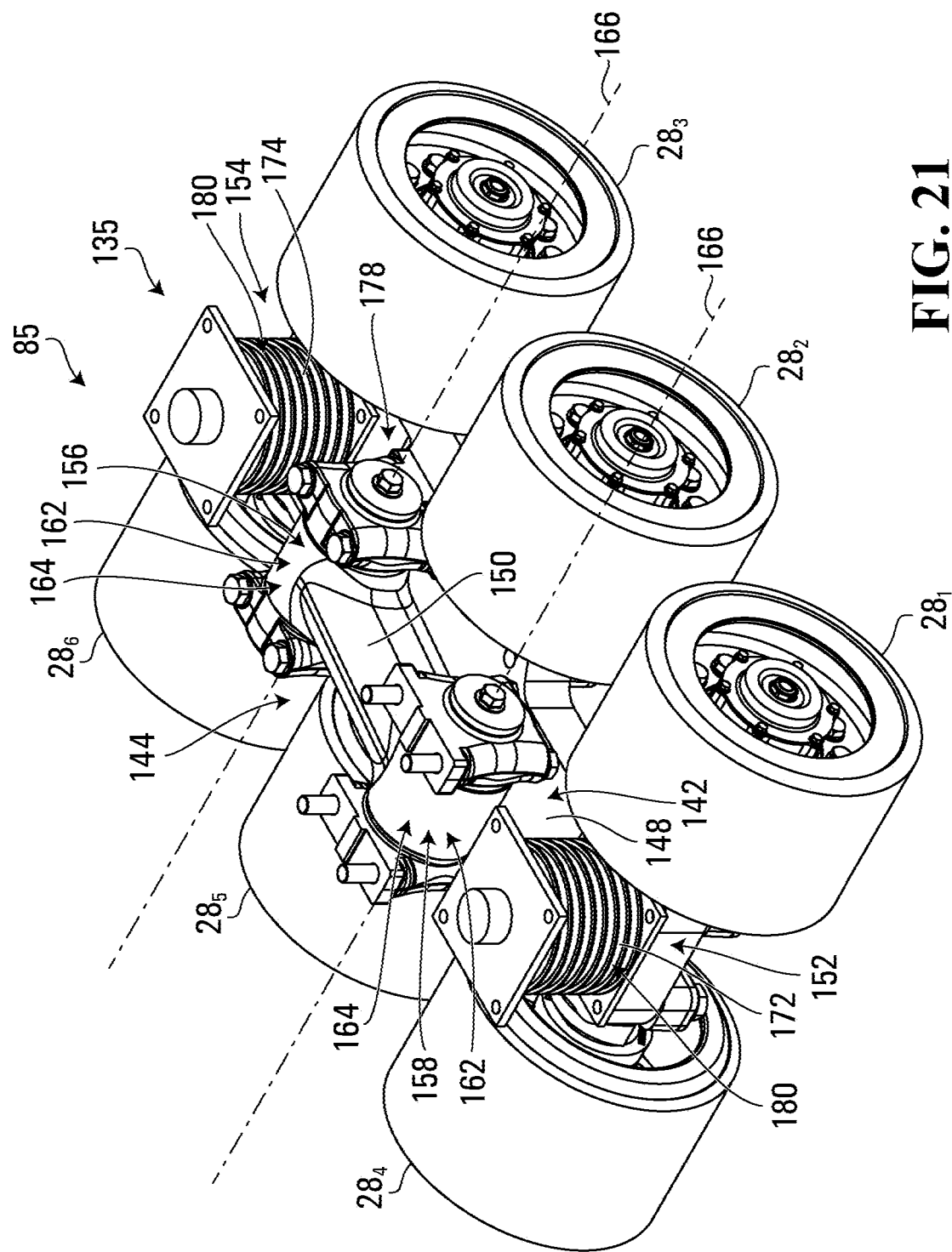
Figure 22:
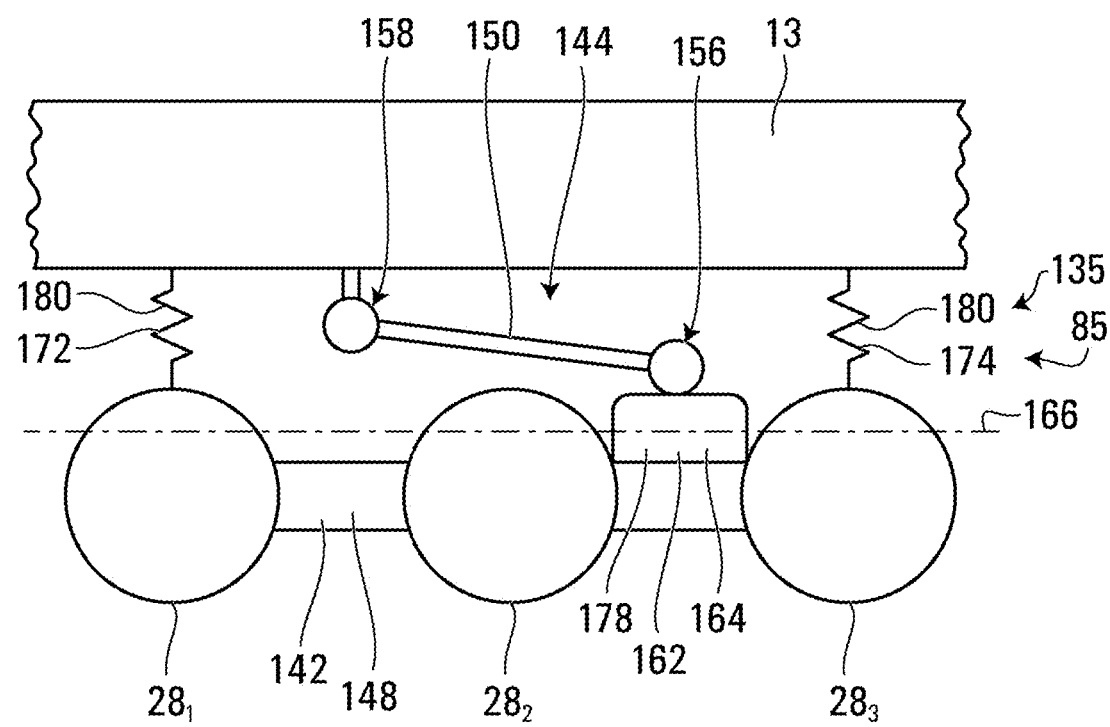

For instance, as shown in FIGS. 21 and 22, in a variant, the linkage mechanism 144 comprises a third movable joint 178 disposed between the first movable joint 156 and the wheel-carrying base 142, and comprising a pivot 162 having a rotational axis 166 that is orthogonal with the rotational axis 166 of the pivot 162 of the first movable joint 156. In this example, the rotational axis 166 of the pivot 162 of the third movable joint 178 is transversal to the widthwise direction of the track system 16 and that is parallel to the longitudinal direction of the track system 16.

Figure 23:
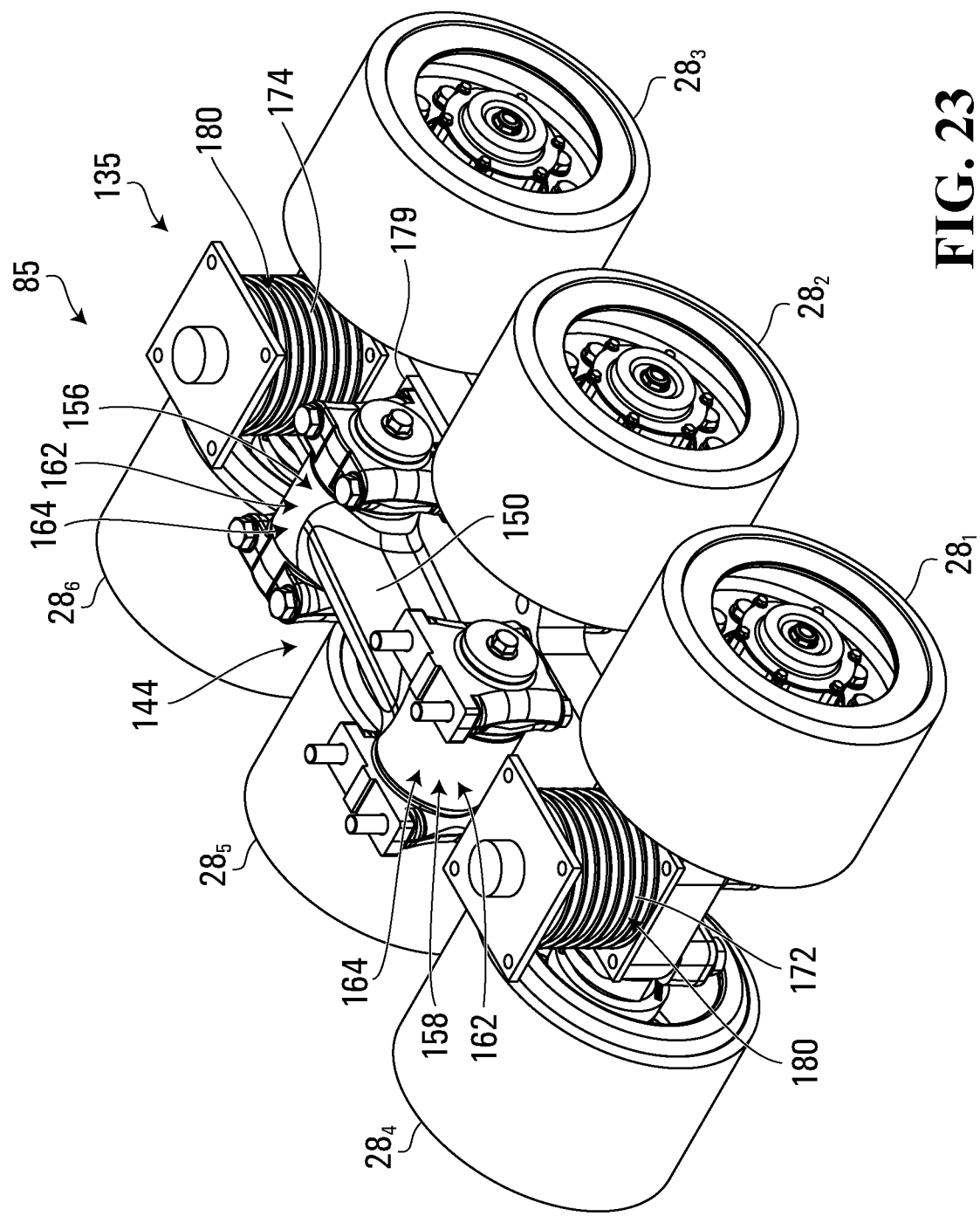
Figure 24:
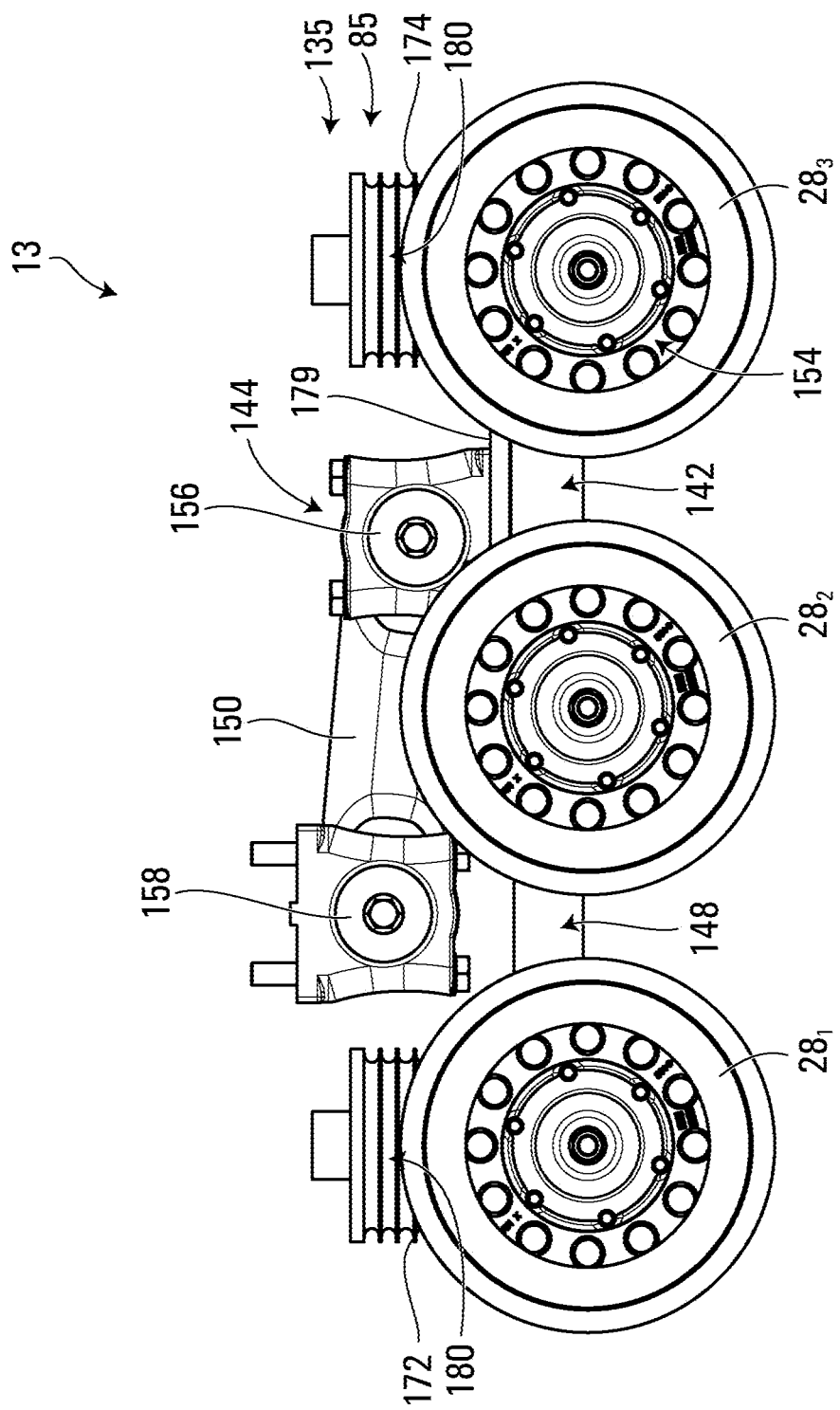

In another variant shown in FIGS. 23 and 24, the linkage mechanism 144 comprises a resilient mount 179 comprising one or more (e.g., at least two) resilient material (e.g., rubber, spring steel), having a pre-determined thickness, and being configured to change from a first configuration to a second configuration in response to a load and recover the first configuration in response to removal of the load. For instance, the thickness of the resilient mount 179 may be at least 0.5 inch, in some embodiments at least 1 inch, in some embodiments at least 1.5 inch, in some embodiments at least 2 inches, and in some embodiments even more. In addition to contributing to managing vibrations, the resilient mount 179 may allow a roll motion of the bogie 85 relative to the frame 13.

As another example, in some embodiments, the track system 16 may comprise a plurality of bogies 85 carrying mid-rollers. Each bogie 85 may comprise a linkage mechanism 144 such that in some occasions, configurations of the linkage mechanisms 144 of each one of the bogies 85 may be different. Then again, two given pairs of the mid-rollers $28_1$-$28_6$, each pair being on a different one of the bogies 85, may be rotatable about two different, distinct pivot axis 140 and may have positions relative to the frame 13 of the track system 16 that are different from one another.

Although the agricultural vehicle 10 illustrated in FIG. 1 is an agricultural tractor comprising four track systems 16, different types of agricultural vehicles configured differently (e.g., having a different number of track systems) may implement improvements based on principles disclosed herein.

Figure 25:
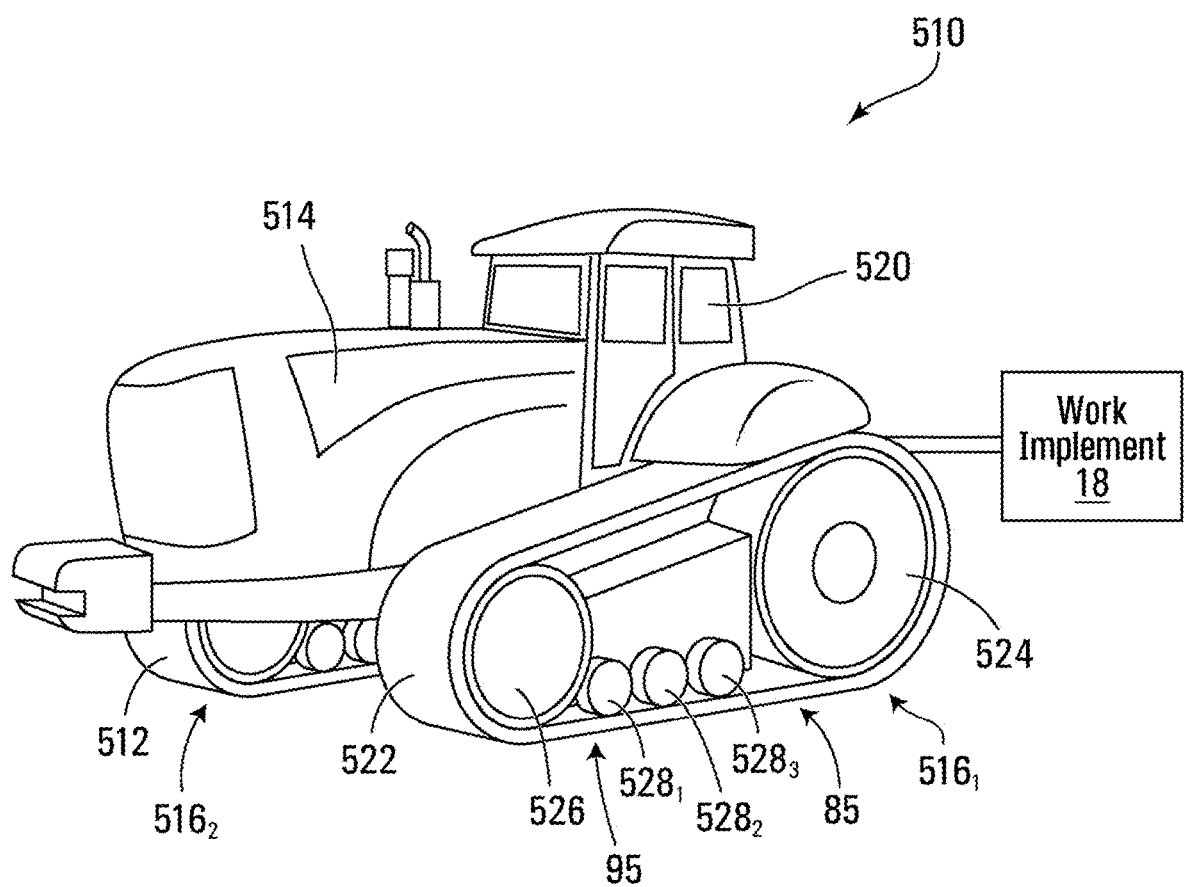
FIG. 25 shows an example of an agricultural vehicle comprising two track systems rather than four.

For instance, with additional reference to FIG. 25, an agricultural vehicle 510 may be provided comprising two track systems $516_1$, $516_2$ rather than four (i.e., one track system 516 at each side of the agricultural vehicle 510). The agricultural vehicle 510 also comprises a frame 512, a prime mover 514, and an operator cabin 520 and can be equipped with the work implement 18 to perform agricultural work. Each track system 516 comprises a drive wheel 524 at a first longitudinal end portion of the track system 516, an idler wheel 526 at a second longitudinal end portion of the track system 516 opposite to the first longitudinal end portion, and a plurality of mid-rollers $528_1$-$528_6$ intermediate the drive wheel 524 and the idler wheel 526. The track system 516 further comprises a track 522 disposed around the wheels 524, 526, $528_1$-$528_6$ and driven by the drive wheel 524. The track system 516 may implement the bogie 85 as described above. Additionally or alternatively, the track 522 may be configured in a manner similar to the track 22 as described above.

Figure 26:
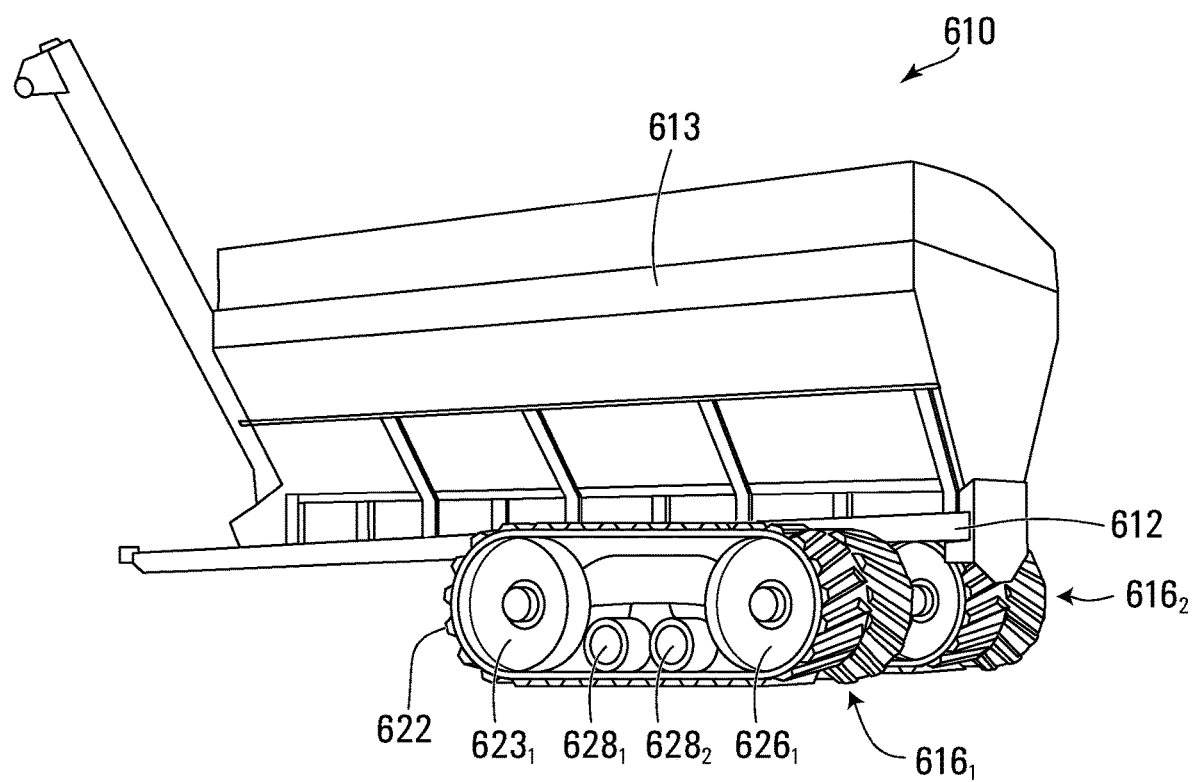
FIG. 26 shows an example of a trailed vehicle configured to be attached to the agricultural vehicle of FIG. 1 or 25.

Furthermore, the work implement 18 that is drawn by the agricultural vehicle 10 or the agricultural vehicle 510 may implement the improvements disclosed herein. For instance, with additional reference to FIG. 26, the work implement 18 may comprise a trailed vehicle 610 comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system 616 of the trailed vehicle 610 comprises front (i.e., leading) idler wheels $623_1$, $623_2$ at a first longitudinal end portion of the track system 616, rear (i.e., trailing) idler wheels $626_1$, $626_2$ at a second longitudinal end portion of the track system 616 opposite the first longitudinal end portion, and a plurality of mid-rollers $628_1$-$628_4$ intermediate the front idler wheels $623_1$, $623_2$ and the rear idler wheels $626_1$, $626_2$. The track system 616 further comprises a track 622 disposed around the wheels $626_1$, $626_2$, $626_1$, $626_2$, $628_1$-$628_4$. The track system 616 may implement the bogie 85 as described above. Additionally or alternatively, the track 622 may be configured in a manner similar to the track 22 as described above.

In this example, the trailed vehicle 610 is not motorized in that it does not comprise a prime mover for driving the track systems $616_1$, $616_2$. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system 616. For example, instead of comprising rear idler wheels $626_1$, $626_2$, the track system 616 may comprise a drive wheel for driving the track 622.

Although in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track system for traction of a vehicle, the track system comprising:
   a frame;
   a track that is elastomeric and comprises a ground-engaging outer surface and an inner surface opposite to the ground-engaging outer surface;
   a plurality of track-contacting wheels for driving and guiding the track around the track-contacting wheels, the track-contacting wheels including: a drive wheel for driving the track; and a plurality of roller wheels for rolling on a lower run of the track;
   a bogie comprising a wheel carrying base carrying given ones of the roller wheels and movable relative to the frame to allow movement of axes of rotation of the given ones of the roller wheels relative to the frame, and a suspension link that extends between the wheel-carrying base and the frame, the bogie comprising:
      a plurality of movable joints spaced apart in a longitudinal direction of the track system and configured to allow the movement of the axes of rotation of the given ones of the roller wheels relative to the frame; and
      a resilient element disposed directly between the bogie and the frame, configured to resiliently affect the movement of the axes of rotation of the given ones of the roller wheels relative to the frame, and spaced apart from the movable joints in the longitudinal direction of the track system,
      wherein the movement of the axes of rotation of the given ones of the roller wheels relative to the frame comprises rotational movement of the axes of rotation of the given ones of the roller wheels relative to the frame about first and second rotational axes transverse to the longitudinal direction of the track system and implemented respectively by first and second ones of the movable joints.

2. The track system of claim 1, wherein the given ones of the roller wheels include a first one of the roller wheels, a second one of the roller wheels, and a third one of the roller wheels that are spaced apart in the longitudinal direction of the track system.

3. The track system of claim 1, wherein the first one of the movable joints is disposed between the wheel-carrying base and the suspension link, and the first one of the movable joints is disposed between the suspension link and the frame.

4. The track system of claim 1, wherein the wheel-carrying base is elongated in the longitudinal direction of the track system.

5. The track system of claim 4, wherein the wheel-carrying base comprises a beam.

6. The track system of claim 1, wherein: the resilient element is a first resilient element; and the track system comprises a second resilient element disposed between the bogie and the frame, configured to resiliently affect the movement of the axes of rotation of the given ones of the roller wheels relative to the frame, and spaced apart from the movable joints in the longitudinal direction of the track system.

7. The track system of claim 1, wherein: the resilient element is a first resilient element; the track system comprises a second resilient element disposed between the bogie and the frame, configured to resiliently affect the movement of the axes of rotation of the given ones of the roller wheels relative to the frame, and spaced apart from the movable joints in the longitudinal direction of the track system, wherein the second resilient element is located at a second longitudinal end portion of the wheel-carrying base opposite to a first longitudinal end portion of the wheel-carrying base.

8. The track system of claim 1, wherein the first and second rotational axis transverse to the longitudinal direction of the track system is substantially parallel to a widthwise direction of the track system.

9. The track system of claim 1, wherein each of the movable joints comprises at least one of a pivot and a resilient component.

10. The track system of claim 1, wherein: the track-contacting wheels include a front idler wheel and a rear idler wheel; the frame carries the front idler wheel and the rear idler wheel; and the roller wheels are disposed between the front idler wheel and the rear idler wheel in the longitudinal direction of the track system.

11. The track system of claim 1, wherein the resilient element comprises at least one of a spring and a piston-cylinder arrangement.

12. The track system of claim 11, wherein the spring is a tower spring.

13. A track system for traction of a vehicle, the track system comprising:
    a frame;
    a track that is elastomeric and comprises a ground-engaging outer surface and an inner surface opposite to the ground-engaging outer surface;
    a plurality of track-contacting wheels for driving and guiding the track around the track-contacting wheels, the track-contacting wheels including: a drive wheel for driving the track; and a plurality of roller wheels for rolling on a lower run of the track;
    a bogie comprising a wheel carrying base carrying given ones of the roller wheels and movable relative to the frame to allow movement of axes of rotation of the given ones of the roller wheels relative to the frame, and a suspension link that extends between the wheel-carrying base and the frame, the bogie comprising
       a plurality of movable joints spaced apart in a longitudinal direction of the track system and configured to allow the movement of the axes of rotation of the given ones of the roller wheels relative to the frame; and
       first and second resilient elements disposed directly between the bogie and the frame, configured to resiliently affect the movement of the axes of rotation of the given ones of the roller wheels relative to the frame, spaced apart from one another in the longitudinal direction of the track system, and spaced apart from the movable joints in the longitudinal direction of the track system;
    wherein the first and second resilient elements are located respectively at first and second longitudinal end portions of the wheel-carrying base.

14. The track system of claim 13, wherein each of the movable joints comprises at least one of a pivot and a resilient component.

15. The track system of claim 13, wherein: the track-contacting wheels include a front idler wheel and a rear idler wheel; the frame carries the front idler wheel and the rear idler wheel; and the roller wheels are disposed between the front idler wheel and the rear idler wheel in the longitudinal direction of the track system.

16. A track system for traction of a vehicle, the track system comprising:
   a frame;
   a track that is elastomeric and comprises a ground-engaging outer surface and an inner surface opposite to the ground-engaging outer surface;
   a plurality of track-contacting wheels for driving and guiding the track around the track-contacting wheels, the track-contacting wheels including: a drive wheel for driving the track; and a plurality of roller wheels for rolling on a lower run of the track;
   a bogie comprising a wheel carrying base carrying given ones of the roller wheels and movable relative to the frame to allow movement of axes of rotation of the given ones of the roller wheels relative to the frame, and a suspension link that extends between the wheel-carrying base and the frame, the bogie comprising:
      a plurality of movable joints spaced apart in a longitudinal direction of the track system and configured to allow the movement of the axes of rotation of the given ones of the roller wheels relative to the frame; and
      a resilient element disposed directly between the bogie and the frame, configured to resiliently affect the movement of the axes of rotation of the given ones of the roller wheels relative to the frame, and spaced apart from the movable joints in the longitudinal direction of the track system
      wherein the movement of the axes of rotation of the given ones of the roller wheels relative to the frame comprises rotational movement of the axes of rotation of the given ones of the roller wheels relative to the frame about at least one rotational axis transverse to the longitudinal direction of the track system and implemented by the movable joints and about at least one rotational axis transverse to the widthwise direction of the track system.

17. The track system of claim 16, wherein the at least one rotational axis transverse to the widthwise direction of the track system is substantially parallel to the longitudinal direction of the track system.

18. The track system of claim 16, wherein the at least one rotational axis transverse to the widthwise direction of the track system is implemented by the movable joints.

19. The track system of claim 16, wherein each of the movable joints comprises at least one of a pivot and a resilient component.

20. The track system of claim 16, wherein: the track-contacting wheels include a front idler wheel and a rear idler wheel; the frame carries the front idler wheel and the rear idler wheel; and the roller wheels are disposed between the front idler wheel and the rear idler wheel in the longitudinal direction of the track system.

* * * * *